United States Patent
Ogura et al.

(10) Patent No.: US 9,176,586 B2
(45) Date of Patent: Nov. 3, 2015

(54) TOUCH PANEL DEVICE WITH TACTILE SENSE PRESENTING FUNCTION

(71) Applicant: Panasonic Corporation, Osaka (JP)

(72) Inventors: Tetsuyoshi Ogura, Osaka (JP); Koichi Hirano, Osaka (JP); Takeshi Suzuki, Osaka (JP); Daisuke Wakuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/241,204

(22) PCT Filed: Jun. 7, 2013

(86) PCT No.: PCT/JP2013/003617
§ 371 (c)(1),
(2) Date: Feb. 26, 2014

(87) PCT Pub. No.: WO2014/002405
PCT Pub. Date: Jan. 3, 2014

(65) Prior Publication Data
US 2014/0225848 A1 Aug. 14, 2014

(30) Foreign Application Priority Data

Jun. 29, 2012 (JP) ................. 2012-147244
Jul. 18, 2012 (JP) ................. 2012-159780
Jul. 18, 2012 (JP) ................. 2012-159783
Jul. 18, 2012 (JP) ................. 2012-159785
Aug. 1, 2012 (JP) ................. 2012-171418

(51) Int. Cl.
*G06F 3/044* (2006.01)
*G06F 3/041* (2006.01)
(Continued)

(52) U.S. Cl.
CPC ............. *G06F 3/016* (2013.01); *G06F 3/041* (2013.01); *G06F 3/044* (2013.01); *G06F 3/0412* (2013.01); *G06F 3/0488* (2013.01); *G06F 3/04883* (2013.01); *G08B 6/00* (2013.01)

(58) Field of Classification Search
CPC combination set(s) only.
See application file for complete search history.

(56) References Cited

U.S. PATENT DOCUMENTS 7,924,144 B2   4/2011   Makinen et al.
7,982,588 B2   7/2011   Makinen et al.
(Continued)

FOREIGN PATENT DOCUMENTS

JP   2002-41208    2/2002
JP   2003-248540   9/2003
(Continued)

OTHER PUBLICATIONS

International Preliminary Report on Patentability issued in International Application No. PCT/JP2013/003616 on Jan. 8, 2015.
(Continued)

*Primary Examiner* — Robin Mishler
(74) *Attorney, Agent, or Firm* — Wenderoth, Lind & Ponack, L.L.P.

(57) ABSTRACT

A touch panel device with the tactile sense presenting function according to this embodiment includes the plurality of electrodes 1 arranged on the single plane, and the controller 20. The controller 20 performs a first operation and a second operation in a time division manner. The first operation includes applying the first voltage which changes temporally, to some of the electrodes 1, detecting voltages generated on at least some of the remaining electrodes 1 in this state, and detecting the position of the dielectric which is in proximity to the touch panel device, on the basis of the detected voltages. The second operation includes applying the second voltage which changes temporally, to some of the electrodes 1, and generating electric field with the some working electrodes 1.

8 Claims, 19 Drawing Sheets

(51) Int. Cl.
  *G06F 3/01* (2006.01)
  *G06F 3/0488* (2013.01)
  *G08B 6/00* (2006.01)

(56) References Cited

U.S. PATENT DOCUMENTS

| | | | |
|---|---|---|---|
| 8,174,373 | B2 | 5/2012 | Makinen et al. |
| 8,212,783 | B2 | 7/2012 | Kim et al. |
| 8,330,590 | B2 | 12/2012 | Poupyrev et al. |
| 8,330,729 | B2 | 12/2012 | Tachi et al. |
| 8,570,163 | B2 | 10/2013 | Makinen et al. |
| 9,063,627 | B2 | 6/2015 | Yairi et al. |
| 2008/0129705 | A1 | 6/2008 | Kim et al. |
| 2009/0079550 | A1 | 3/2009 | Makinen et al. |
| 2009/0109007 | A1 | 4/2009 | Makinen et al. |
| 2009/0174671 | A1 | 7/2009 | Tachi et al. |
| 2010/0085169 | A1 | 4/2010 | Poupyrev et al. |
| 2011/0074733 | A1 | 3/2011 | Makinen et al. |
| 2011/0109588 | A1 | 5/2011 | Makinen et al. |
| 2011/0141052 | A1 | 6/2011 | Bernstein et al. |
| 2011/0254799 | A1 | 10/2011 | Makinen et al. |
| 2012/0062516 | A1 | 3/2012 | Chen et al. |
| 2012/0133645 | A1 | 5/2012 | Jung et al. |
| 2012/0242463 | A1 | 9/2012 | Makinen et al. |
| 2014/0146005 | A1 | 5/2014 | Hong et al. |
| 2014/0160063 | A1 | 6/2014 | Yairi et al. |
| 2014/0160064 | A1 | 6/2014 | Yairi et al. |
| 2014/0192005 | A1 | 7/2014 | Wakuda et al. |
| 2014/0225848 | A1 | 8/2014 | Ogura et al. |
| 2014/0240110 | A1 | 8/2014 | Suzuki et al. |
| 2014/0293147 | A1 | 10/2014 | Tang et al. |
| 2014/0340210 | A1 | 11/2014 | Wakuda et al. |
| 2015/0149967 | A1 | 5/2015 | Bernstein et al. |

FOREIGN PATENT DOCUMENTS

| | | |
|---|---|---|
| JP | 2004-319255 | 11/2004 |
| JP | 2005-55489 | 3/2005 |
| JP | 2005-85048 | 3/2005 |
| JP | 2006-163206 | 6/2006 |
| JP | 2006-251948 | 9/2006 |
| JP | 2007-87239 | 4/2007 |
| JP | 2008-146649 | 6/2008 |
| JP | 2009-87359 | 4/2009 |
| JP | 2010-86471 | 4/2010 |
| JP | 2011-2926 | 1/2011 |
| JP | 2011-107879 | 6/2011 |
| JP | 2012-114920 | 6/2012 |
| WO | 2010/139171 | 12/2010 |

OTHER PUBLICATIONS

International Preliminary Report on Patentability issued in International Application No. PCT/JP2013/003617 on Jan. 8, 2015.
International Preliminary Report on Patentability issued in International Application No. PCT/JP2013/003870 on Jan. 8, 2015.
International Preliminary Report on Patentability issued in International Application No. PCT/JP2013/003871 on Jan. 8, 2015.
International Preliminary Report on Patentability issued in International Application No. PCT/JP2013/003872 on Jan. 8, 2015.
International Search Report (ISR) issued Aug. 20, 2013 in International (PCT) Application No. PCT/JP2013/003617.
International Search Report (ISR) issued Jul. 23, 2013 in International (PCT) Application No. PCT/JP2013/003616.
International Search Report (ISR) issued Sep. 17, 2013 in International (PCT) Application No. PCT/JP2013/003870.
International Search Report (ISR) issued Sep. 17, 2013 in International (PCT) Application No. PCT/JP2013/003871.
International Search Report (ISR) issued Sep. 17, 2013 in International (PCT) Application No. PCT/JP2013/003872.
USPTO Office Action issued Jul. 17, 2015 in related U.S. Appl. No. 14/241,639.
USPTO Office Action issued Jul. 31, 2015 in related U.S. Appl. No. 14/241,701.

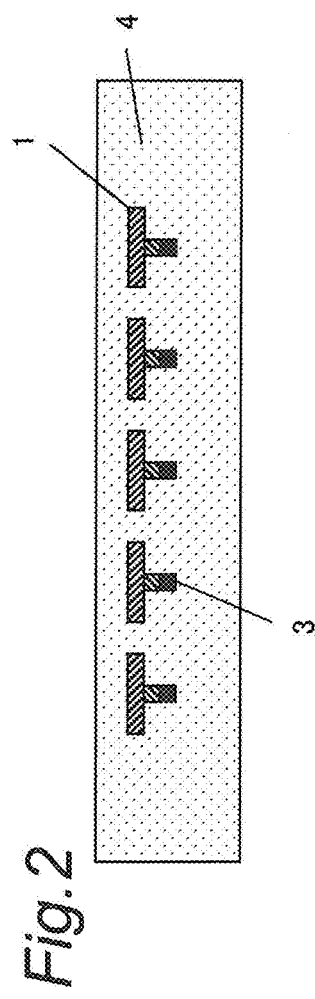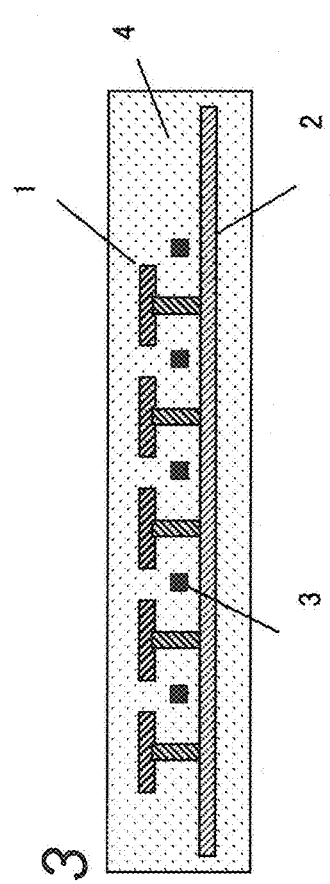

TOUCH PANEL DEVICE WITH TACTILE SENSE PRESENTING FUNCTION

TECHNICAL FIELD

The present invention relates to a touch panel device with a tactile sense presenting function, the touch panel device that presents a tactile sense to a user.

BACKGROUND ART

In recent years, a touch panel has been laminated on a screen of a mobile phone, banking terminal, game machine or the like in some cases. A user manipulates such an apparatus by touching a specific portion on the touch panel with his/her finger, a pen or the like while visually identifying a button or an icon displayed on the screen of the apparatus.

Further, in recent years, there are developed techniques for presenting a tactile sense to a user when the user touches a screen of an apparatus. As the techniques, there are a technique disclosed in Patent Literature 1, and a technique disclosed in Patent Literature 2.

Patent Literature 1 discloses a tactile sense presentation device including a touch panel having a plurality of planar electrodes is disposed for presenting a tactile sense on a rear surface thereof. In this device, a voltage which changes temporally is applied to the planar electrode. When a finger approaches the electrode to which the voltage is applied, an electrode-finger-electrode circuit is formed. Herein, an electric field is generated between the finger and the electrode, and an electrostatic force based on the electric field forms a tactile sense to be presented to the finger.

Patent Literature 2 discloses a touch panel device with a tactile sense presenting function, the touch panel device including piezoelectric elements. According to this disclosed technique, the touch panel device with the tactile sense presenting function realizes a function as a touch panel and a function as a tactile sense presentation device, with one panel having the piezoelectric elements.

PRIOR ART DOCUMENT

Patent Document

Patent Document 1: JP 2009-87359 A
Patent Document re 2: JP 2011-2926 A

SUMMARY OF INVENTION

Problems to be Solved by the Invention

It is an object of the present invention to provide a touch panel device with a tactile sense presenting function, the touch panel device being capable of efficiently presenting a tactile sense to a user.

Means for Solving the Problems

According to one aspect of the present invention, a touch panel device with a tactile sense presenting function includes: a plurality of electrodes arranged on a single plane; and a controller that performs a first operation and a second operation in a time division manner. Herein, the first operation includes applying a first voltage which changes temporally, to some of the electrodes, detecting voltages generated on at least some of the remaining electrodes in this state, and detecting a position of a dielectric which is in proximity to the touch panel device, on the basis of the detected voltages. Moreover, the second operation includes applying a second voltage which changes temporally, to some of the electrodes, and generating a varying electric field with the some electrodes.

Effects of the Invention

According to the present invention, it is possible to provide a touch panel device with a tactile sense presenting function, the touch panel device being capable of efficiently presenting a tactile sense to a user.

BRIEF DESCRIPTION OF DRAWINGS

FIG. 2 is a sectional view taken along a line (a) in FIG. 1.

FIG. 3 is a sectional view taken along a line (b) in FIG. 1.

Figure 1:
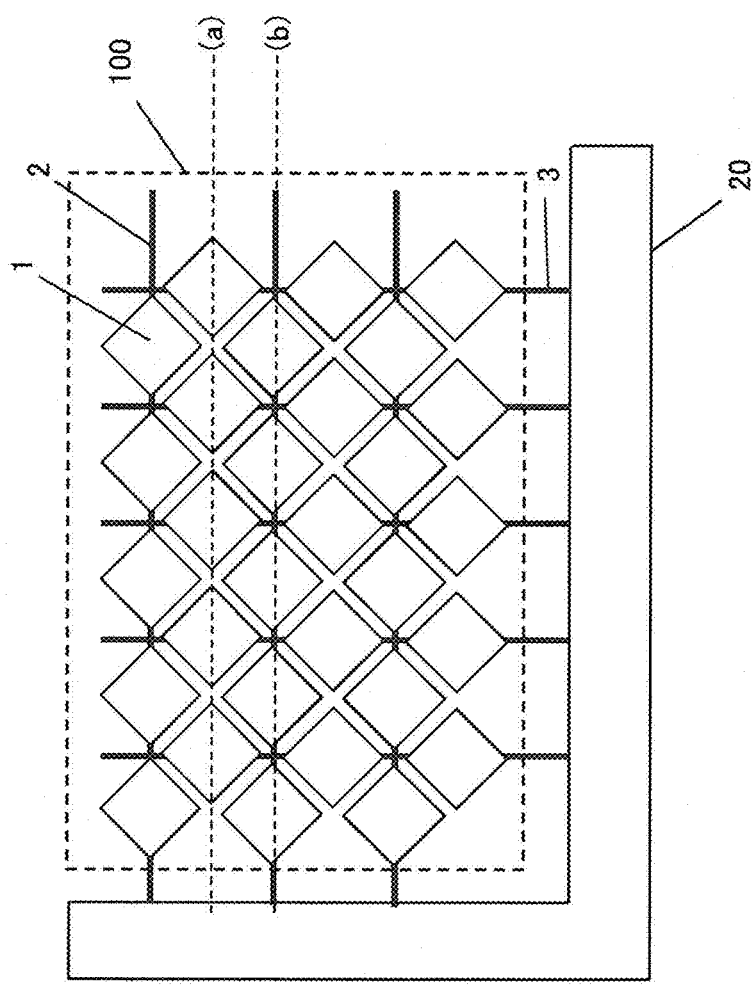
FIG. 1 is a diagram illustrating a structure of a touch panel with a tactile sense presenting function according to a first embodiment regarding one aspect of the present invention.

MODE FOR CARRYING OUT THE INVENTION (Reasons for Leading to One Embodiment of the Present Invention)

In the device disclosed in Patent Literature 1, the electrodes for tactile sense presentation are disposed on the rear surface of the touch panel. The presence of the touch panel decreases the electrostatic force between the electrodes for tactile sense presentation and the finger. Accordingly, the electrostatic force is not efficiently exerted on the user's finger.

In order to solve this problem, the inventor has studied to dispose the electrodes for tactile sense presentation on a front surface of the touch panel. However, this configuration causes a problem that the touch panel is degraded in sensitivity of touch sensing because the electrodes for tactile sense presentation are interposed between the touch panel and the finger.

In other words, the device disclosed in Patent Literature 1 is incapable of efficiently exerting the electrostatic force on the user's finger and improving the sensitivity of touch sensing in the touch panel because of the configuration that the electrodes for tactile sense presentation are superposed on the touch panel.

Hence, it is considered that the touch panel and the electrodes for tactile sense presentation are arranged on a single plane. Patent Literature 2 discloses such a configuration. Specifically, the piezoelectric elements are used for realizing the function as the touch sensor and the function as the tactile sense presentation device in a time division manner.

The studies conducted by the inventor on the configuration in Patent Literature 2 have revealed the following fact. That is, in order that the piezoelectric element presents a satisfactory tactile sense to the finger, it is necessary that an amount of displacement of the piezoelectric element is equal to or more than an amount of displacement capable of presenting a satisfactory tactile sense to the finger. In order to obtain this amount of displacement, the piezoelectric element gains in thickness, so that the transparency of the tactile sense presentation device is degraded. It has been found from the result that visibility becomes poor with regard to an image displayed on a liquid crystal display device which is provided on a rear surface of the touch panel device.

Hence, the inventor has eagerly studied for providing a touch panel device with a tactile sense presenting function, the touch panel device being capable of efficiently presenting a tactile sense to a user without degrading visibility regarding an image displayed on a liquid crystal display device even when the touch panel device is provided on a front surface of the liquid crystal display device, and thus has conceived the following configuration.

According to one aspect of the present invention, a touch panel device with a tactile sense presenting function includes: a plurality of electrodes arranged on a single plane; and a controller that performs a first operation and a second operation in a time division manner. Herein, the first operation includes applying a first voltage which changes temporally, to some of the electrodes, detecting voltages generated on at least some of the remaining electrodes in this state, and detecting a position of a dielectric which is in proximity to the touch panel device, on the basis of the detected voltages. Moreover, the second operation includes applying a second voltage which changes temporally, to some of the electrodes, and generating a varying electric field with the some electrodes.

Hereinafter, description will be given of preferred embodiments with reference to the drawings.

(First Embodiment)

FIG. 1 is a diagram illustrating a structure of a passive matrix-type touch panel device with a tactile sense presenting function according to a first embodiment regarding one aspect of the present invention. FIG. 2 is a sectional view taken along a line (a) in FIG. 1. FIG. 3 is a sectional view taken along a line (b) in FIG. 1.

The touch panel device with the tactile sense presenting function includes a touch panel 100 with the tactile sense presenting function (hereinafter, referred to as the "touch panel 100"), and a controller 20.

The touch panel 100 includes a plurality of working electrodes 1, a plurality of first conductors 2, a plurality of second conductors 3 and an insulator 4.

Each of the working electrodes 1 has a thickness of 100 nm and is made of ITO (Indium Tin Oxide). Each of the working electrodes 1 has a 0.8 mm-square size. The working electrodes 1 are arranged in a single plane form with a 1 mm-pitch such that a length therebetween is 0.2 mm.

The first conductors 2 are disposed below the working electrodes 1, and extend in a certain direction. In this embodiment, the first conductors 2 extend in a parallel direction with the plane where the working electrodes 1 are arranged.

The second conductors 3 are disposed below the working electrodes 1, and extend in a certain direction which is different from the extending direction of the first conductors 2. In this embodiment, the second conductors 3 extend in the parallel direction with the plane where the working electrodes 1 are arranged and in an orthogonal direction to the first conductors 2.

Each of the first conductor 2 and the second conductor 3 has a thickness of 100 nm and a line width of 50 μm, and is made of ITO (Indium Tin Oxide).

Each of the working electrodes 1 is electrically connected to the first conductor 2 or the second conductor 3 at the lower side thereof.

The insulator 4 surrounds the working electrodes 1. The insulator 4 is made of a glass material. The insulator 4 has a thickness of 1 μm at a surface of the working electrode 1. Herein, the material for the insulator 4 is not limited to a glass material. For example, the insulator 4 may be made of a material which ensures an insulation property and transparency.

The controller 20 makes the touch panel 100 function as a touch sensor or a tactile sense presentation device in a time division manner. The controller 20 makes a processor execute a program for realizing this function, thereby realizing functions to be described later. Herein, the controller 20 may be realized with a hard-wired element capable of realizing this function.

In the case of making the touch panel 100 function as a touch sensor, the controller 20 applies a drive voltage to the predetermined second conductor 3. Thus, the working electrodes 1 on the second conductor 3 serve as drive electrodes. At the same time, the controller 20 detects voltages on the respective first conductors 2. That is, the working electrodes 1 on the corresponding first conductor 2 serve as sensing electrodes. Then, the controller 20 identifies a position of a dielectric such as a human finger, on the basis of the position of the second conductor 3 to which the drive voltage is applied, and the voltages detected on the first conductors 2. After the detection of the voltages on the first conductors 2 by the application of the drive voltage to the second conductor 3, the controller 20Z may change the second conductor 3 to which the drive voltage is applied, to the adjacent second conductor 3, and then detects the voltages on the respective first conductors 2 again, controller repeatedly perform this operation described above to identify the position of the dielectric such as the human finger, on the basis of a result of the operation. Thus, it is possible to improve position identifying accuracy.

In the case of making the touch panel 100 function as a tactile sense presentation device, the controller 20 applies an electric potential difference to between the predetermined second conductor 3 and the predetermined first conductor 2 in a tactile sense presentation target area.

Figure 4:
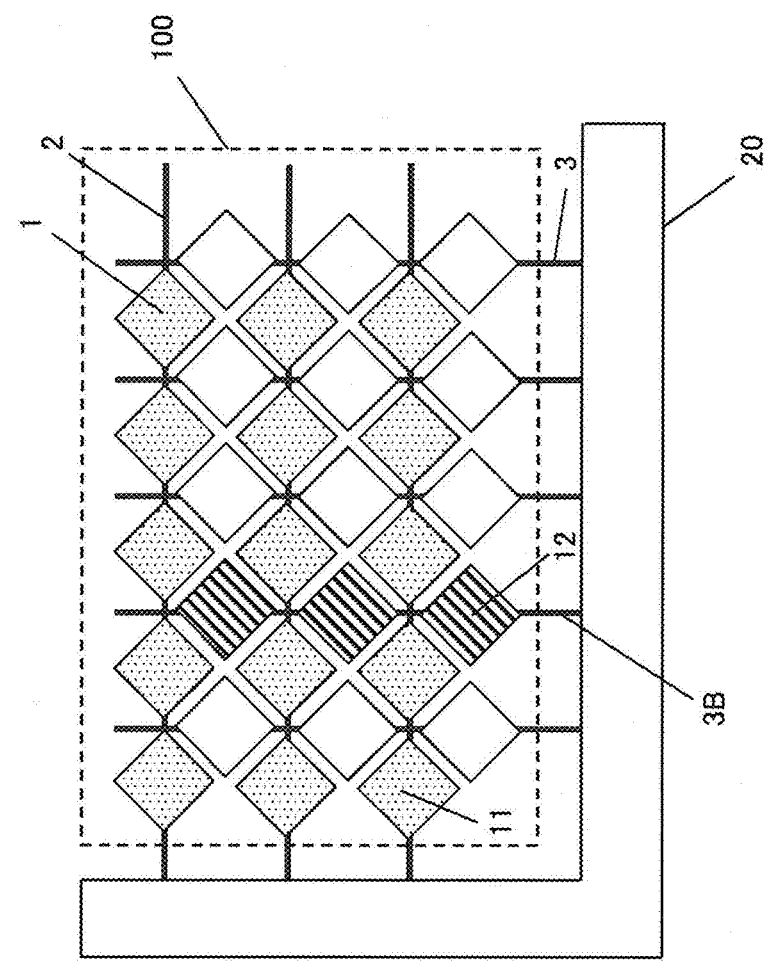
FIG. 4 is a diagram illustrating a state that a touch panel 100 with the tactile sense presenting function is used as a touch sensor.

FIG. 4 is a diagram illustrating one example of the state of the touch panel 100 functioning as a touch sensor.

In the example illustrated in FIG. 4, the controller 20 applies a drive voltage (touch drive) to the second conductor 3B among the plurality of second conductors 3 to sequentially detect electric potentials at the respective first conductors 2 (touch sensing). Among the plurality of working electrodes 1, thus, the working electrodes 1 electrically connected to the second conductor 3B operate as drive electrodes 12 (the hatched working electrodes 1 in FIG. 4). On the other hand, the working electrodes 1 connected to the first conductors 2 operate as sensing electrodes 11 (the dotted working electrodes 1 in FIG. 4).

In a case of feeding, for example, an AC signal to the drive electrode 12, the first conductor 2 produces an AC signal responsive to a capacitance between the drive electrode 12 and the sensing electrode 11. The capacitance between the drive electrode 12 and the sensing electrode 11 varies depending on the presence or absence of a dielectric such as a human finger on the drive electrode 12 and the sensing electrode 11. Therefore, it is possible to detect the capacitance between the drive electrode 12 and the sensing electrode 11 by applying an AC voltage to the drive electrode 12 and measuring a waveform at the sensing electrode 11. Then, it is possible to detect the presence or absence of the dielectric such as the human finger on the basis of this capacitance. Moreover, it is possible to identify a position of the dielectric such as the human finger, from the position of the driven second conductor 3 and the position of the first conductor 2 on which the signal is detected. Further, it is possible to sequentially change the working electrodes 1 which is subjected to function as the drive electrode 12, by sequentially changing the second conductor 3 to which the AC voltage is applied, to the adjacent second conductor 3. Thus, it is possible to detect a position of the dielectric such as the human finger on a touch surface, where the plurality of working electrodes 1 is arranged, of the touch panel device with the tactile sense presenting function.

The capacitance between the drive electrode 12 and the sensing electrode 11 was actually measured by application of a rectangular wave at a voltage of 5 V and in a frequency of 1 kHz to the drive electrode 12. The measured capacitance was 0.01 pF in the absence of a finger, and was 0.12 pF in the presence of the finger. Then, the presence or absence of the finger could be detected on the basis of the measured capacitance. Herein, an area which covers the electrode varies depending on the size and position of a dielectric (e.g., a finger), and the capacitance value changes in accordance with this variation. It is noted that the conditions such as the voltage at the time of the measurement are merely one example, and the capacitance does not change because of the conditions. According to the configuration described above, it is possible to detect the position and shape of a dielectric with an accuracy equal to or less than 1 mm. In this measurement, it was possible to detect the position of the finger in a unit of 0.1 ma.

Figure 5:
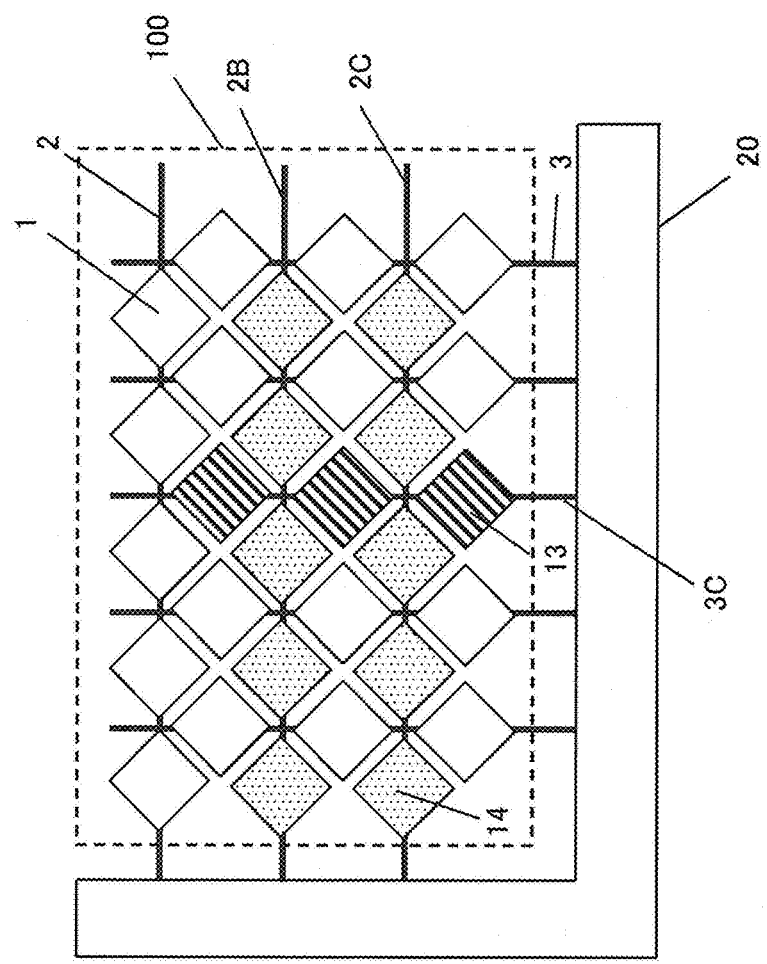
FIG. 5 is a diagram illustrating a state that the touch panel 100 with the tactile sense presenting function is used as a tactile sense presentation device.

FIG. 5 is a diagram illustrating the state of the touch panel 100 functioning as a tactile sense presentation device.

In the example illustrated in FIG. 5, the controller 20 applies a drive voltage (a positive tactile sense) to the second conductor 3C among the plurality of second conductors 3. The controller 20 also applies a drive voltage (a negative tactile sense) to the first conductors 2B and 2C among the plurality of first conductors 2. In other words, the controller 20 applies a voltage which is equivalent to a difference between the drive voltage (the positive tactile sense) and the drive voltage (the negative tactile sense), to between the second conductor 3C and the first conductors 2B and 2C. Thus, some of the working electrodes 1 operate as positive working electrodes 13 (the hatched working electrodes 1 illustrated in FIG. 6). Moreover, some of the remaining working electrodes 1 operate as negative working electrodes 14 (the dotted working electrodes 1 illustrated in FIG. 6). Herein, a prescribed voltage is applied to the positive working electrode 13. For example, the positive working electrode 13 refers to the working electrode 1 to which a voltage equal to or greater than 0 V is applied, and the negative working electrode 14 refers to the working electrode 1 to which a voltage equal to or less than 0 V is applied. Actually, there is no necessity that the voltage on the positive working electrode 13 and the voltage on the negative working electrode 14 are opposite in a sign to each other as long as the two voltages are different from each other.

Figure 6:
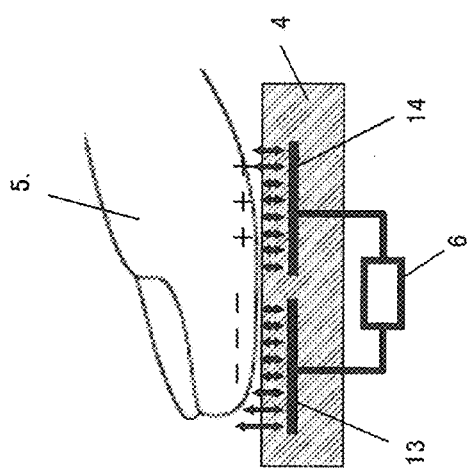
FIG. 6 is a sectional view illustrating a state that a dielectric 5 is on working electrodes 1.

FIG. 6 is a sectional view illustrating a state that a dielectric 5 is above the working electrodes 1.

In the example illustrated in FIG. 6, the dielectric 5 is a human finger. A voltage source 6 applies a voltage to between the positive working electrode 13 and the negative working electrode 14. It is assumed herein that the voltage source 6 applies a voltage illustrated in FIG. 7B to between the positive working electrode 13 and the negative working electrode 14.

Figure 7B:
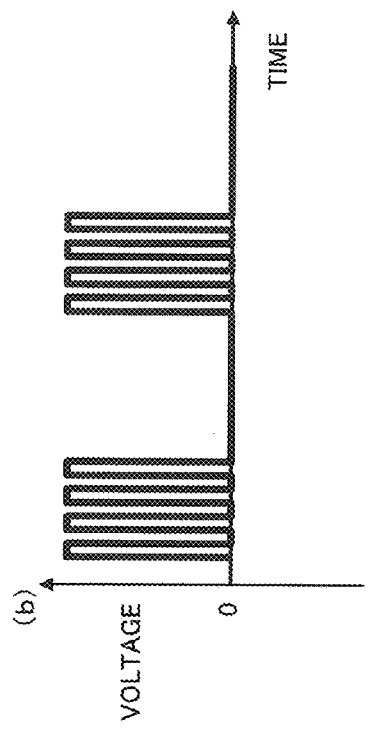
FIGS. 7A and 7B are diagrams each illustrating a waveform of a voltage from a voltage source 6.
Figure 7A:
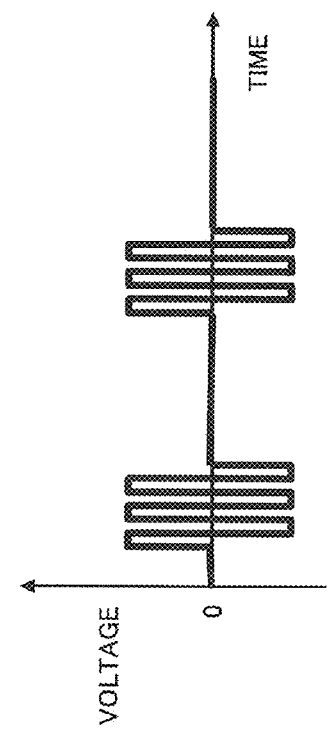

FIGS. 7A and 7B each illustrate a waveform of a voltage from the voltage source 6. Specifically, FIG. 7($a$) illustrates a case where the voltage from the voltage source 6 changes in a pulse-like manner between a predetermined positive value and a predetermined value having reverse polarity to the predetermined positive value. FIG. 7B illustrates a case where the voltage from the voltage source 6 changes in a pulse-like manner between the predetermined positive value and 0.

When the voltage source 6 applies the voltage illustrated in FIG. 7A to between the positive working electrode 13 and the negative working electrode 14, an electric field is generated between each of the working electrodes 13 and 14 and the dielectric 5 with the insulator 4 therebetween. Specifically, a negative electric charge is generated on a portion of the dielectric 5 facing the positive working electrode 13. On the other hand, a positive electric charge is generated on a portion of the dielectric 5 facing the negative working electrode 14. As the result, an electrostatic force is exerted on between the electric charge on the dielectric 5 and the positive working electrode 13 or the negative working electrode 14. Thus, the dielectric 5 receives the electrostatic force in the direction of the working electrode 1. The electrostatic force exerted on the dielectric 5 changes when the voltage from the voltage source 6 is temporally varied. The user perceives as vibrations the change of the electrostatic force on the dielectric 5 (the finger).

Typically, a user moves his/her finger in parallel with an object's surface to perceive vibrations based on irregularities of the object's surface, through his/her finger. Thus, the user obtains a tactile sense, such as a rough texture or a smooth texture, based on the strength and frequency of the vibrations. The touch panel device with the tactile sense presenting function makes the user perceive vibrations through his/her finger by means of the electrostatic force which varies temporally, thereby presenting a pseudo rough texture or smooth texture to the user.

Herein, the voltage illustrated in FIG. 7B may be applied. The voltages in this example change in a pulse-like manner between a predetermined positive value and a predetermined value having reverse polarity to the predetermined positive value. For example, by applying a voltage of 5 to 200 V (peak value) to the positive working electrode 13 and applying a voltage of 0 V in a frequency of 20 to 500 Hz to the negative working electrode 14, a rough tactile sense could be obtained. The degree of the rough tactile sense increases as a high voltage is applied to the positive working electrode 13, and decreases as a low voltage is applied. In the case of the voltage of 0 to 5 V, the rough tactile sense could not be obtained, but a smooth tactile sense like glass could be obtained. In the frequency range of 20 to 500 Hz, moreover, a feel of a coarse surface could be obtained in a relatively low frequency while a feel of a fine surface could be obtained in a relatively high frequency. Thus, various tactile senses from the smooth tactile sense like glass to the rough tactile sense could be expressed by setting the peak value of the voltage at an optional value within the range of 0 to 200 V and setting the frequency at an optional value within the range of 0 to 500 Hz. Further, the tactile sense can be temporally changed when the voltage and the frequency are temporally changed.

In this embodiment, it is possible to detect a target object to be detected when a capacitance in a case where the target object is in proximity to the drive electrode 12 and the sensing electrode 11 is different from a capacitance in a case where no target object, but only air is in proximity to the drive electrode 12 and the sensing electrode 11. In other words, it is possible to detect various objects in addition to a human finger and the like, as long as such an object is a dielectric which is different in dielectric constant from air. For example, it is possible to detect an electro-conductive body because the electro-conductive body changes a capacitance between the drive electrode 12 and the sensing electrode 11. Moreover, it is also possible to detect a pen made of organic resin, a pen made of metal, and a glove.

In this embodiment, the signal to be fed to the drive electrode 12 is a rectangular wave signal at a voltage of 5 V and in a frequency of 1 kHz. However, the voltage, waveform and frequency of the signal to be fed to the drive electrode 12 are not limited to those described above, as long as the signal is capable of detecting a capacitance change due to the presence of a dielectric upon detection of a touched position. For example, the signal waveform may be a triangular wave, a step signal, a sinusoidal wave or the like. Moreover, the voltage may be a low voltage which allows sensing, or may be a high voltage which falls within a range of a withstand voltage of an IC for detection.

In this embodiment, the working electrode 1 has a diamond shape, but may have any shape as long as a capacitance can be formed between the working electrode 1 and a human finger or the like. For example, the working electrode 1 may have a square shape, a rectangular shape, a hexagonal shape or a round shape. Moreover, the working electrode 1, the first conductor 2 and the second conductor 3 are made of ITO, but may be made of any material as long as such a material is electrically conductive. Examples of the electrically conductive material may include metal oxides such as ZnO (Zinc Oxide), metals such as Al, Ag and Au, and electro-conductive organic materials. Further, the insulator 4 is made of glass, but may be made of any material as long as such a material has an insulation property. Examples of the insulating material may include organic insulating materials such as PET and polyimide. Herein, each of the working electrode 1, the first conductor 2, the second conductor 3 and the insulator 4 may be made of a material which allows a visible light beam to pass therethrough, such as ITO, ZnO or glass. As a result, the liquid crystal display device is not degraded in displaying function even when the touch panel device with the tactile sense presenting function is provided on the front surface of the liquid crystal display device.

In this embodiment, the thickness of the insulator 4 at the surface of the working electrode 1 is 1 μm, but not limited thereto.

The following mathematical expression 1 represents a change amount Δf/S per unit area of an electrostatic force exerted on the dielectric 5 from the touch panel 100 when the dielectric 5 is in proximity to the surface of the touch panel 100 in the state that the voltage which changes temporally is applied to between the positive working electrode 13 and the negative working electrode 14.

$$\frac{\Delta f}{S} \propto \frac{\varepsilon_r \varepsilon_0 \Delta V^2}{h^2} \qquad \text{(Expression 1)}$$

In the mathematical expression 1, Δf represents the change amount of the force exerted on the dielectric 5; S represents a projection area of the dielectric 5 onto the plane formed of the working electrodes 1, i.e., an area of a capacitance formed by the dielectric 5 and the working electrode 1; $\varepsilon_r$ represents a dielectric constant of the insulator 4; $\varepsilon_0$ represents a dielectric constant in a vacuum; ΔV represents a maximum value of the electric potential difference between the working electrode 1 and the dielectric 5 (which is the electric potential difference between the positive working electrode 13 and the negative working electrode 14, and a temporal change amount of the electric potential at the positive working electrode 13 (the negative working electrode 14)); and h represents a length between the working electrode 1 and the dielectric 5. During the use, typically, the dielectric 5 is in contact with the surface of the insulator 4. In the mathematical expression 1, therefore, h represents the thickness of the insulator 4 at the surface of the working electrode 1. It is apparent from the mathematical expression 1 that the change amount Δf/S per unit area of the force is proportional to the square of the voltage difference ΔV, and is inversely proportional to the square of the thickness h of the insulator 4. In this embodiment, the tactile sense presenting function was attained in the case where the thickness h of the insulator 4 is 1 μm and the voltage ΔV is in the range from 0 to 200 V. In the case of ΔV/h>5 [V/μm], the satisfactory change amount Δf/S per unit area of the force is obtained. For example, when the thickness of the insulator is 10 μm, the tactile sense presenting function is attained at the range where the voltage ΔV is equal to or greater than 50 V.

In this embodiment, the working electrodes 1 are disposed with the 1 mm-pitch. Herein, a human finger has touch receptors with an about 2 mm-pitch in order to receive tactile sense information. Accordingly, the pitch between the working electrodes 1 may be, for example, equal to or less than 2 μL. Preferably, the pitch is equal to or less than 1 HELL.

As described above, the touch panel device with the tactile sense presenting function according to this embodiment includes the plurality of working electrodes 1 arranged on the single plane, and the controller 20. The controller 20 performs the first operation and the second operation in a time division manner. Herein, the first operation includes applying the first voltage which changes temporally, to some of the working electrodes 1, detecting voltages generated on at least some of the remaining working electrodes 1 in this state, and detecting the position of the dielectric which is in proximity to the touch panel device, on the basis of the detected voltages. Moreover, the second operation includes applying the second voltage which changes temporally, to some of the working electrodes 1, and generating the varying electric field with the some working electrodes 1.

According to this configuration, the controller 20 performs the first operation to apply the first voltage which changes temporally, to some of the working electrodes 1 and to detect the voltages generated on at least some of the remaining working electrodes 1 in this state. Then, the controller 20 detects the position of the dielectric which is in proximity to the touch panel device, on the basis of the detected voltages. In the case where the dielectric is a user's finger or the like, the touch panel device with the tactile sense presenting function is capable of detecting the position indicated by the user with his/her finger.

Moreover, the controller 20 performs the second operation to apply the second voltage which changes temporally, to some of the working electrodes 1 and to generate the electric field from the some working electrodes 1. In the case where the dielectric is in proximity to the some working electrodes 1, the dielectric is stimulated by the varying electric field with the working electrodes 1. In the case where the dielectric is a user's finger or the like, the user receives a tactile sense from the changing electric field through his/her finger.

According to this embodiment, as described above, the touch panel device with the tactile sense presenting function performs the different operations in the time division manner by means of the plurality of working electrodes 1. Thus, the touch panel device with the tactile sense presenting function is capable of realizing the function as the touch sensor and the function as the tactile sense presentation device by means of the plurality of working electrodes 1 arranged on the single plane.

Each of the working electrode 1, the first conductor 2 and the second conductor 3 may have a thickness of about 100 nm and may be made of ITO (Indium Tin Oxide) as described above. Therefore, the touch panel 100 with the tactile sense presenting function is allowed to have both the function as the touch sensor and the function as the tactile sense presentation device, and is allowed to have a thinner structure than a touch panel with a tactile sense presenting function, the touch panel including piezoelectric elements and the like. Therefore, the touch panel 100 according to this embodiment is capable of ensuring favorable transparency. Accordingly, even when the touch panel 100 is provided on the front surface of the liquid crystal display device, the liquid crystal display device is capable of ensuring favorable visibility regarding an image displayed thereon. Moreover, the touch panel 100 provided on the front surface of the liquid crystal display device is capable of efficiently presenting a tactile sense to a user in the case of functioning as the tactile sense presenting device. Moreover, the touch panel 100 is also capable of favorably detecting the position of the dielectric (e.g., the finger) in the case of functioning as the touch sensor.

According to this embodiment, as described above, it is possible to provide a touch panel device with a tactile sense presenting function, the touch panel device being capable of efficiently presenting a tactile sense to a user without degrading visibility regarding an image displayed on a liquid crystal display device even when the touch panel device is provided on a front surface of the liquid crystal display device.

Herein, the touch panel device with the tactile sense presenting function according to this embodiment is of a passive matrix type. Thus, it is possible to select the working electrode 1 for providing the touch sensor function and the tactile sense presenting function, among the plurality of working electrodes 1 in a unit of the first conductor 2 or in a unit of the second conductor 3.

In the touch panel device with the tactile sense presenting function according to this embodiment, the insulator 4 is disposed on the surfaces of the working electrodes 1. Thus, it is possible to prevent an object such as a finger from coming into direct contact with the surface of each working electrode 1. Accordingly, it is possible to realize with reliability the touch sensor function by means of the capacitance between the working electrodes 1 and the tactile sense presenting function by means of the electric field between the electrode and the dielectric.

In the touch panel device with the tactile sense presenting function according to this embodiment, the first conductor 2 and the second conductor 3 are orthogonal to each other. This facilitates the disposition of the working electrodes 1.

(Second Embodiment)

Figure 8:
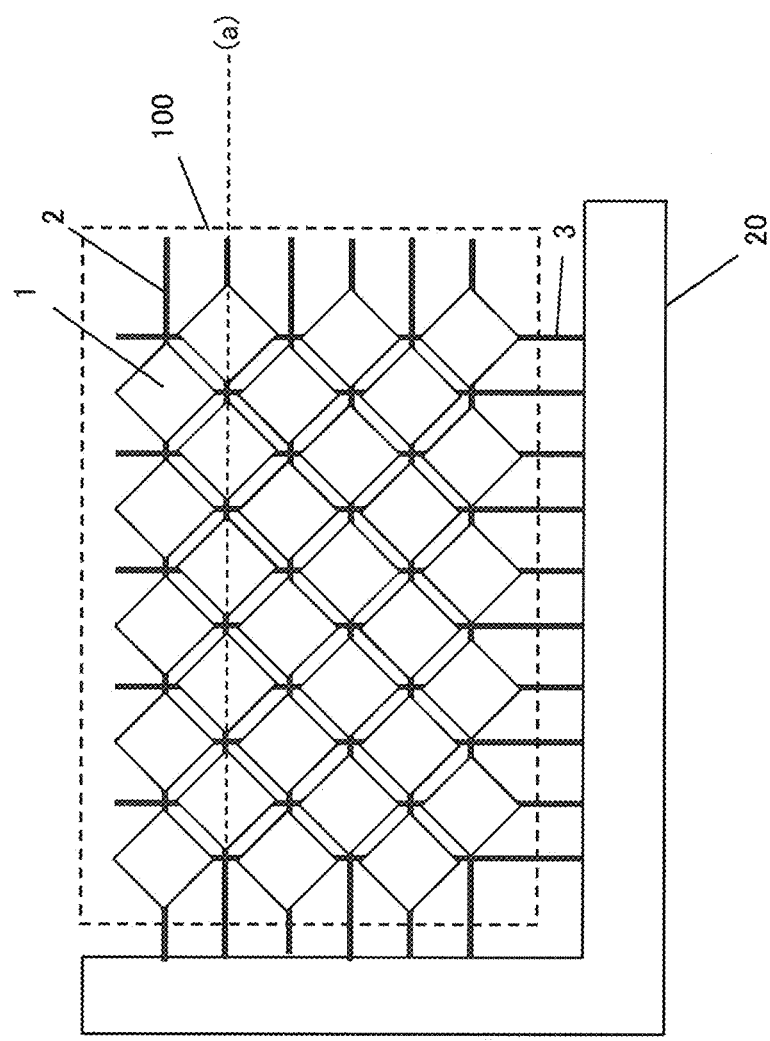
FIG. 8 is a diagram illustrating a structure of a touch panel with a tactile sense presenting function according to a second embodiment regarding another aspect of the present invention.
Figure 9:
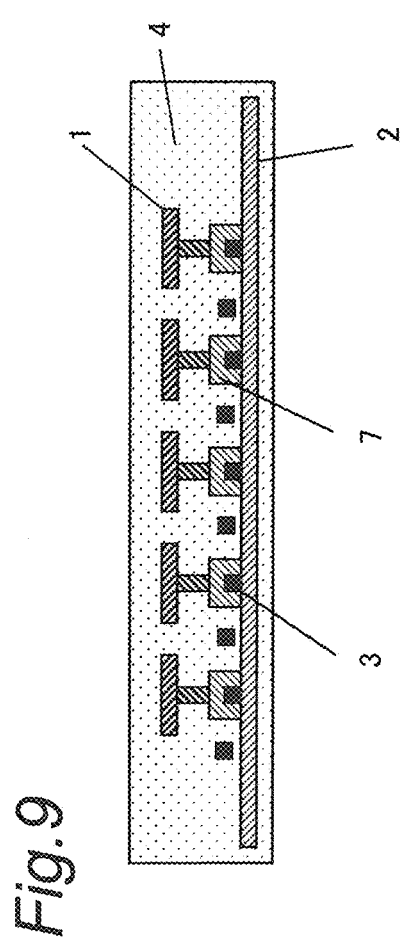
FIG. 9 is a sectional view taken along a line (a) in FIG. 8.

FIG. 8 is a diagram illustrating a structure of an active matrix-type touch panel device with a tactile sense presenting function according to a second embodiment regarding another aspect of the present invention. FIG. 9 is a sectional view taken along a line (a) in FIG. 8. In the second embodiment, constituent elements similar to those in the first embodiment are denoted with the same reference signs in the first embodiment. Also in the second embodiment, description will not be given of similar configurations, actions and effects to those in the first embodiment. The similar things may hold true for third, fourth and fifth embodiments to be described later.

The touch panel device with the tactile sense presenting function includes a touch panel 100 and a controller 20.

The touch panel 100 includes a plurality of working electrodes 1, a plurality of first conductors 2, a plurality of second conductors 3, an insulator 4, and a plurality of semiconductor circuits 7.

Each of the working electrodes 1 has a thickness of 100 nm and is made of ITO (Indium Tin Oxide). Each of the working electrodes 1 has a 0.8 mm-square size. The working electrodes 1 are arranged in a single plane form with a 1 mm-pitch such that a length therebetween is 0.2 mm.

The first conductors 2 are disposed below the working electrodes 1, and extend in a certain direction. In this embodiment, the first conductors 2 extend in a parallel direction with the plane where the working electrodes 1 are arranged.

The second conductors 3 are disposed below the working electrodes 1, and extend in a certain direction which is different from the extending direction of the first conductors 2. In this embodiment, the first conductors 2 extend in the parallel direction with the plane where the working electrodes 1 are arranged and in an orthogonal direction to the first conductors 2.

Each of the first conductor 2 and the second conductor 3 has a thickness of 100 nm and a line width of 50 μm, and is made of ITO (Indium Tin Oxide), for example.

For the sake of convenience, FIG. 8 collectively illustrates a drive line for applying a voltage to the working electrode 1, a drive line for detecting an electric charge and a voltage on the working electrode 1, an X-direction selection line for controlling the semiconductor circuit 7 and a Y-direction selection line for controlling the semiconductor circuit 7, as one with regard to each of the first conductor 2 and the second conductor 3. Each of the first conductor 2 and the second conductor 3 includes one of the drive line, the X-direction selection line and the Y-direction selection line. Each of the first conductor 2 and the second conductor 3 may be appropriately set as to which line is included. Description of configuration examples of the semiconductor circuit 7, drive line, X-direction selection line and Y-direction selection line will be given later in the third embodiment.

The insulator 4 surrounds the working electrodes 1. The insulator 4 is made of a glass material. The insulator 4 has a thickness of 1 μm at a surface of the working electrode 1.

The semiconductor circuits 7 are disposed below the working electrodes 1, respectively. Each of the semiconductor circuits 7 is configured with a TFT. The semiconductor circuit 7 terminates the connection between the working electrode 1 arranged above the semiconductor circuit 7 and the first conductor 2 or the second conductor 3 arranged below the semiconductor circuit 7, on the basis of a selection signal from the controller 20. The semiconductor circuit 7 to be applicable in this embodiment may be similar to a semiconductor circuit 7 to be described later in the third embodiment. With regard to the drive line, the X-direction selection line and the Y-direction selection line, the layout and the laying method may be changed appropriately.

The controller 20 makes the touch panel 100 function as a touch sensor or a tactile sense presentation device in a time division manner.

In the case of making the touch panel 100 function as a touch sensor, the controller 20 brings the semiconductor circuits 7 on the predetermined second conductor 3 into an ON state, and connects the working electrodes 1 arranged above the second conductor 3 to the second conductor 3. Then, the controller 20 applies a drive voltage to the second conductor 3. Thus, the working electrodes 1 on the second conductor 3 serve as drive electrodes 12. At the same time, the controller 20 brings the semiconductor circuits 7 corresponding to the predetermined first conductor 2 into the ON state, and connects the working electrodes 1 on the semiconductor circuits 7 to the first conductor 2. Then, the controller 20 detects a voltage on the first conductor 2. Thus, the working electrodes 1 on the first conductor 2 serve as sensing electrodes 11. Moreover, the controller 20 identifies a position of a dielectric such as a human finger, on the basis of the position of the second conductor 3 to which the drive voltage is applied, and the voltages detected on the respective first conductors 2. Alternatively, after the detection of the voltages on the first conductors 2 by the application of the drive voltage to the second conductor 3, the controller 20 may change the second conductor 3 to which the drive voltage is applied, to the adjacent second conductor 3, and then detect the voltages on the respective first conductors 2 again. The controller 20 may repeatedly perform this operation described above to identify the position of the dielectric such as the human finger, on the basis of a result of the operation. Thus, it is possible to improve position identifying accuracy.

In the case of making the touch panel 100 function as a tactile sense presentation device, the controller 20 brings the semiconductor circuits 7 on the predetermined second conductor 3 into the ON state, and connects the working electrodes 1 corresponding to the semiconductor circuits 7 to the second conductor 3. Moreover, the controller 20 brings the semiconductor circuits 7 on the predetermined first conductor 2 into the ON state, and connects the working electrodes 1 corresponding to the semiconductor circuits 7 to the first conductor 2. Then, the controller 20 applies an electric potential difference to between the second conductor 3 and the first conductor 2.

In the foregoing description, one of the first conductor 2 and the second conductor 3 is designated upon application of the voltage to the working electrodes 1; however, the voltage may be applied through the other conductor.

Figure 13:
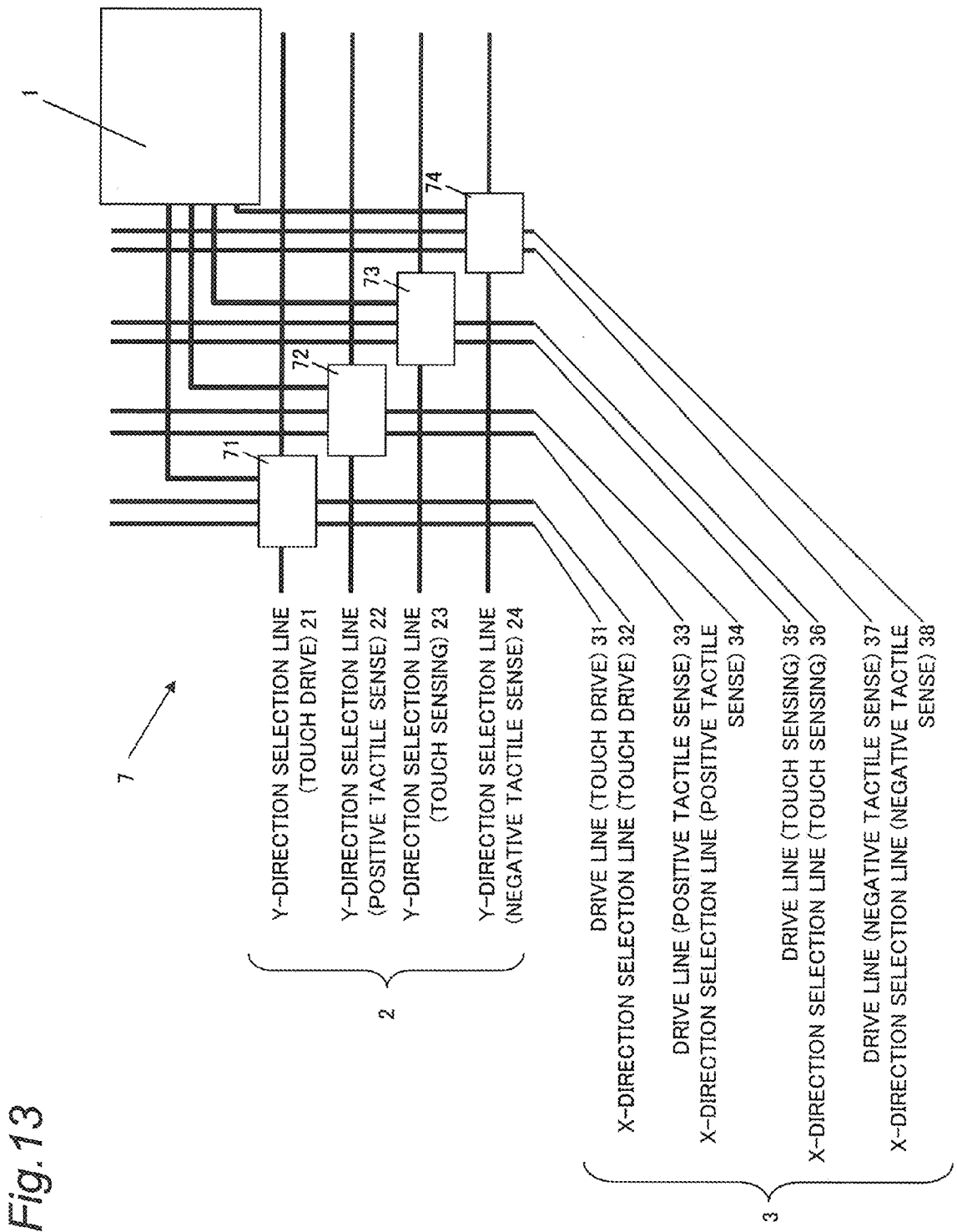
FIG. 13 is a diagram illustrating one example of a circuit configuration including first conductors 2, second conductors 3 and semiconductor circuits 7.

With regard to the semiconductor circuit 7, this embodiment may employ the specific configuration and operations to be described later in the third embodiment in detail. In this embodiment, the drive voltage applying drive line is provided separately in the X direction and the Y direction, but may be provided in parallel with the X-direction selection line as illustrated in FIG. 13.

Figure 10:
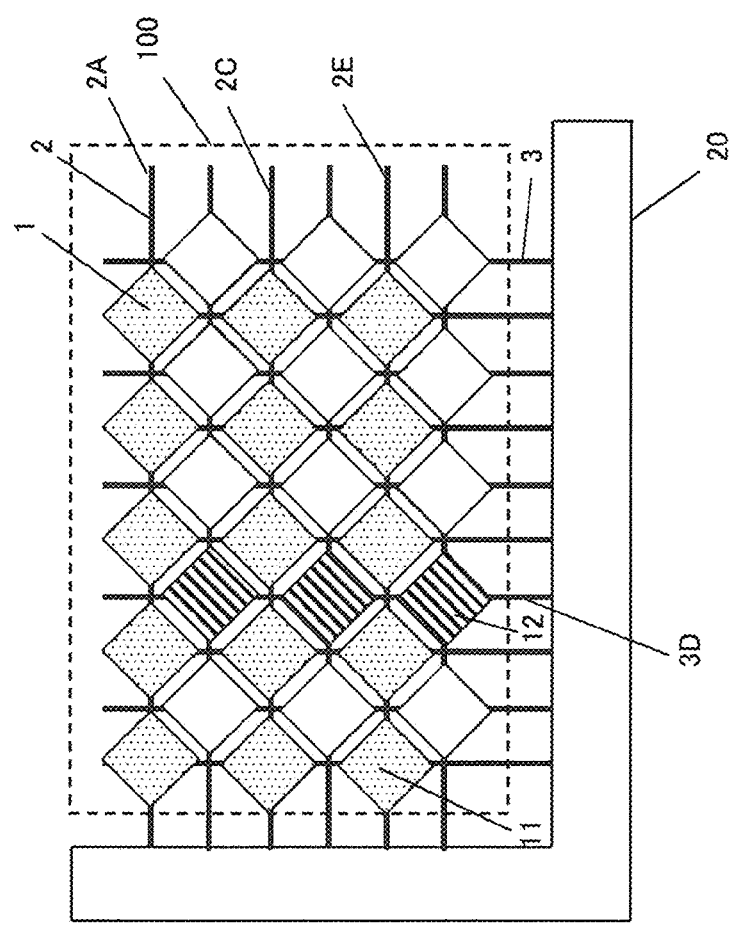
FIG. 10 is a diagram illustrating a state that a touch panel 100 with the tactile sense presenting function is used as a touch sensor.

FIG. 10 is a diagram illustrating the state of the touch panel 100 functioning as a touch sensor.

In the example illustrated in FIG. 10, the controller 20 applies a drive voltage (touch drive) to the second conductor 3D among the plurality of second conductors 3, and sequentially detects electric potentials at the first conductors 2A, 2C and 2E among the plurality of first conductors 2 (touch sensing). In this embodiment, the semiconductor circuits 7 form an active matrix. Therefore, it is possible to make only the working electrode 1 which is subjected to function as the drive electrode 12 or the sensing electrode 11, rather than all the working electrodes 1 on one line or one row, selectively function as the drive electrode 12 or the sensing electrode 11. Actions to be effected by the drive electrode 12 and the sensing electrode 11 are similar to those in the first embodiment; therefore, the description thereof will not be given here.

Figure 11:
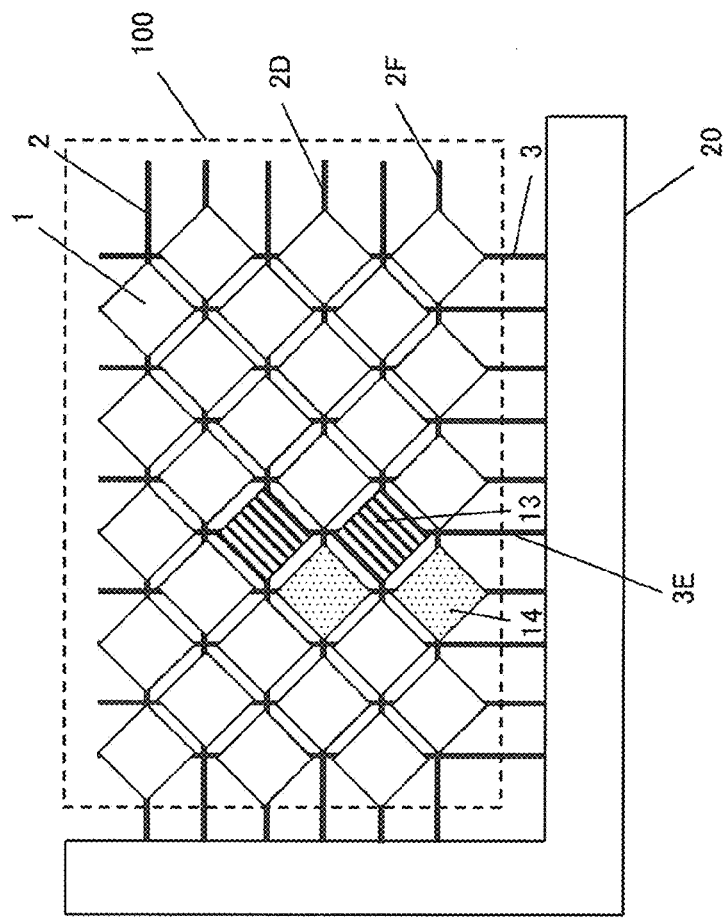
FIG. 11 is a diagram illustrating a state that the touch panel 100 with the tactile sense presenting function is used as a tactile sense presentation device.

FIG. 11 is a diagram illustrating the state of the touch panel 100 functioning as a tactile sense presentation device.

In the example illustrated in FIG. 11, the controller 20 applies a drive voltage (positive tactile sense) to the second conductor 3E among the plurality of second conductors 3, and applies a drive voltage (negative tactile sense) to the first conductors 2D and 2F among the plurality of first conductors 2. In other words, the controller 20 applies a voltage which is equivalent to a difference between the drive voltage (positive tactile sense) and the drive voltage (negative tactile sense), to between the second conductor 3E and the first conductors 2D and 2F. In this embodiment, the touch panel 100 is driven by the semiconductor circuits 7 that form the active matrix. Therefore, it is possible to make only the working electrode 1 which is subjected to function as the positive working electrode 13 or the negative working electrode 14, rather than all the working electrodes 1 on one line or one row, selectively function as the positive working electrode 13 or the negative working electrode 14. Actions to be effected by the positive working electrode 13 and the negative working electrode 14 are similar to those in the first embodiment; therefore, the description thereof will not be given here.

In this embodiment, as described above, the touch panel device with the tactile sense presenting function is of the active matrix type. Thus, it is possible to realize a touch sensor function and a tactile sense presenting function selectively as to the optional working electrodes 1 among the plurality of working electrodes 1.

The touch panel device with the tactile sense presenting function according to this embodiment includes the semiconductor circuits 7, in addition to the configuration described in the first embodiment. Herein, the semiconductor circuit 7 may be configured with a TFT, for example. It is possible to ensure suitable transparency of the touch panel 100 because the TFT is thin. According to this embodiment, hence, it is possible to provide a touch panel device with a tactile sense presenting function, the touch panel device being capable of efficiently presenting a tactile sense without degrading visibility regarding an image displayed on a liquid crystal display device even when the touch panel device is provided on a front surface of the liquid crystal display device.

(Third Embodiment)

This embodiment describes one example of a specific configuration of a touch panel device with a tactile sense presenting function in order to realize a touch sensing function and a tactile sense presenting function in a time division manner.

Figure 12:
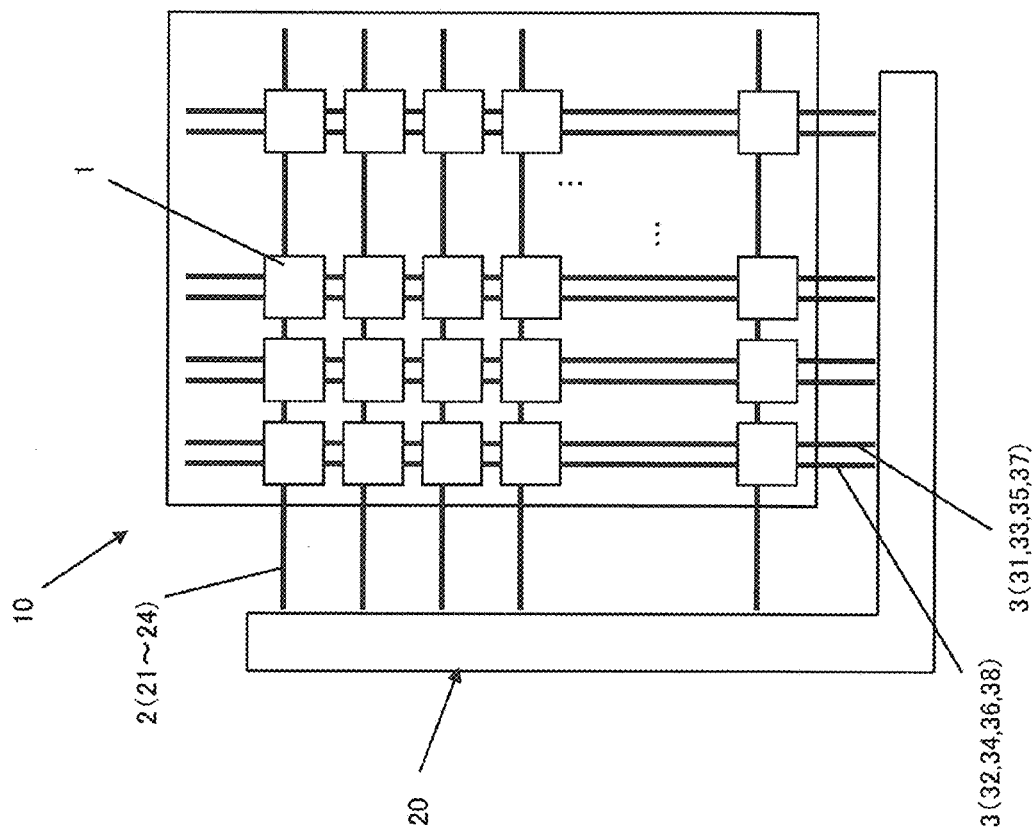
FIG. 12 is a diagram illustrating a configuration of a touch panel device with a tactile sense presenting function according to a third embodiment regarding still another aspect of the present invention.

FIG. 12 is a diagram illustrating the configuration of the touch panel device with the tactile sense presenting function according to the third embodiment regarding still another aspect of the present invention.

The touch panel device with the tactile sense presenting function according to the third embodiment includes a touch panel 10 with the tactile sense presenting function, and a controller 20.

As in the first and second embodiments, the touch panel device with the tactile sense presenting function includes a plurality of working electrodes 1, a plurality of first conductors 2, a plurality of second conductors 3, and an insulator (not illustrated). Moreover, semiconductor circuits are disposed below the working electrodes 1, respectively. This embodiment describes a case where the working electrode 1 has a square shape, but may be applied to the case where the working electrode 1 has a diamond shape or the like as in the first and second embodiments.

The controller 20 outputs signals to the first conductor 2 and second conductor 3 to realize the touch sensing function and the tactile sense presenting function in the time division manner in the touch panel with the tactile sense presenting function. Specific description of the control by the controller 20 will be given later.

Prior to the description of the signals to be output to the first conductor 2 and second conductor 3, description will be given of the configuration including the first conductors 2, the second conductors 3 and the semiconductor circuits 7.

FIG. 13 is a diagram illustrating one example of the specific circuit configuration including the working electrode 1, the first conductors 2, the second conductors 3 and the semiconductor circuits 7.

In this embodiment, the first conductors 2 include four selection lines, i.e., a Y-direction selection line (touch drive) 21, a Y-direction selection line (positive tactile sense) 22, a Y-direction selection line (touch sensing) 23 and a Y-direction selection line (negative tactile sense) 24.

The second conductors 3 include eight conductors, i.e., a drive line (touch drive) 31, an X-direction selection line (touch drive) 32, a drive line (positive tactile sense) 33, an X-direction selection line (positive tactile sense) 34, a drive line (touch sensing) 35, an X-direction selection line (touch sensing) 36, a drive line (negative tactile sense) 37 and an X-direction selection line (negative tactile sense) 38.

The semiconductor circuits 7 include four identical semiconductor circuits 71 to 74.

The semiconductor circuit 71 is disposed on an intersection among the X-direction selection line (touch drive) 32, the drive line (touch drive) 31 and the Y-direction selection line (touch drive) 21. The semiconductor circuit 72 is disposed on an intersection among the X-direction selection line (positive tactile sense) 34, the drive line (positive tactile sense) 33 and the Y-direction selection line (positive tactile sense) 22. The semiconductor circuit 73 is disposed on an intersection among the X-direction selection line (touch sensing) 36, the drive line (touch sensing) 35 and the Y-direction selection line (touch sensing) 23. The semiconductor circuit 74 is disposed on an intersection among the X-direction selection line (negative tactile sense) 38, the drive line (negative tactile sense) 37 and the Y-direction selection line (negative tactile sense) 24. The semiconductor circuits 71 to 74 are connected to the working electrode 1.

Figure 14:
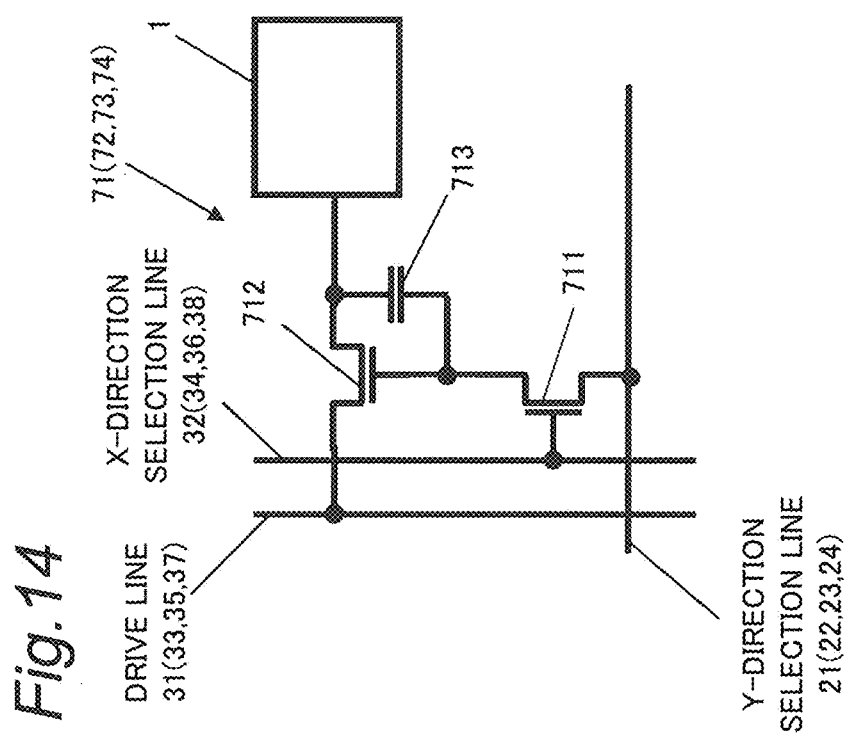
FIG. 14 is a diagram illustrating one example of a specific configuration of the semiconductor circuit 71.

FIG. 14 is a diagram illustrating a specific configuration of each of the semiconductor circuits 71 to 74. The semiconductor circuits 71 to 74 are identical in configuration with one another. Therefore, the semiconductor circuit 71 will be described as an example.

The semiconductor circuit 71 includes an X-direction selection semiconductor element 711 and a driver semiconductor element 712.

The X-direction selection semiconductor element 711 is a semiconductor element for selecting an X direction. The X-direction selection semiconductor element 711 is connected between the Y-direction selection line 21 and a gate of the driver semiconductor element 712. The X-direction selection semiconductor element 711 has a gate connected to the X-direction selection line 32.

The driver semiconductor element 712 is connected between the working electrode 1 and the drive line 31, and terminates the connection between the drive line 31 and the working electrode 1. The gate of the driver semiconductor element 712 is connected to the terminal other than the gate terminal of the X-direction selection semiconductor element 711.

A holding capacitor 713 is connected between the gate of the driver semiconductor element 712 and the working electrode 1.

When an ON voltage is applied to the X-direction selection line 32 and the Y-direction selection line 21, the X-direction selection semiconductor element 711 is brought into an ON state. Then, an electric charge is accumulated on the holding capacitor 713, so that the driver semiconductor element 712 is brought into the ON state. Thereafter, even when the voltage on the X-direction selection line 32 is changed to an OFF voltage and, further, the electric potential on the Y-direction selection line 21 is changed, the electric charge on the holding capacitor 713 is maintained, and the driver semiconductor element 712 is maintained at the ON state. When a drive voltage is applied to the drive line 31 in this state, then the drive voltage is applied to the working electrode 1.

Then, when the ON voltage is applied to the X-direction selection line 32 and the OFF voltage is applied to the Y-direction selection line 21, the X-direction selection semiconductor element 711 is brought into the ON state, the electric charge is discharged from the holding capacitor 713, and the driver semiconductor element 712 is brought into an OFF state. Thereafter, by changing the voltage on the X-direction selection line 32 to the OFF voltage, the driver semiconductor element 712 is maintained at the OFF state even when the voltage on the Y-direction selection line 21 is further changed. Even when the drive voltage is applied to the drive line 31 in this state, the voltage on the drive line 31 is not applied to the working electrode 1.

In this embodiment, the semiconductor circuit 71 is described among the semiconductor circuits 71 to 74. In the case of the semiconductor circuit 73, the semiconductor circuit 73 is operated as in the semiconductor circuit 71 to guide the electric charge and electric potential on the working electrode 1 to the controller through the drive line 35. In the case of the semiconductor circuit 72, the semiconductor circuit 72 is operated as in the semiconductor circuit 71 to apply a drive voltage for tactile sense presentation from the controller to the working electrode 1 through the drive line 33. In the case of the semiconductor circuit 74, the semiconductor circuit 74 is operated as in the semiconductor circuit 71 to apply a drive voltage (negative tactile sense) for tactile sense presentation from the controller to the working electrode 1 through the drive line 37.

As described above, the semiconductor circuit concerning the predetermined function is brought into the ON state among the semiconductor circuits 71 to 74 illustrated in FIG. 13, so that the working electrode 1 is allowed to function as one of the drive electrode 12 of the touch sensor, the sensing electrode 11 of the touch sensor, the positive electrode 13 for the tactile sense presenting function, and the negative electrode 14 for the tactile sense presenting function.

Specific description will be given of the case where the working electrode 1 is allowed to function as the drive electrode 12 of the touch sensor. First, the ON voltage is applied to the X-direction selection line (touch drive) 32 and the Y-direction selection line (touch drive) 21 each corresponding to the working electrode 1 which is subjected to function as the drive electrode 12 of the touch sensor, to electrically charge the holding capacitor 713 of the semiconductor circuit 71 disposed on the intersection between the selection lines 21 and 32. Next, the ON voltage is applied to the X-direction selection line (positive tactile sense) 34, the X-direction selection line (touch sensing) 36 and the X-direction selection line (negative tactile sense) 38, and then the OFF voltage is applied to the Y-direction selection line (positive tactile sense) 22, the Y-direction selection line (touch sensing) 23 and the Y-direction selection line (negative tactile sense) 24 to electrically discharge the electric charge from the holding capacitors 713 corresponding to the respective semiconductor circuits 72, 73 and 74. Thus, the voltage on the drive line (touch drive) 31 appears on the working electrode 1, and the voltage on the working electrode 1 does not depend on the voltages on the drive line (positive tactile sense) 33, drive line (touch sensing) 35 and drive line (negative tactile sense) 37.

After a lapse of a predetermined period of time, further, the holding capacitors 713 of the semiconductor circuits 71 to 74 are electrically recharged or discharged using the corresponding first conductors 2 and second conductors 3, so that the respective working electrodes 1 are allowed to have the different functions.

In the configuration illustrated in FIG. 13, four semiconductor circuits 71 to 74 are connected to one working electrode 1. Then, one working electrode 1 is allowed to function as one of the drive electrode of the touch sensor, the sensing electrode of the touch sensor, the positive electrode for tactile sense presentation, and the negative electrode for tactile sense presentation, in the time division manner. However, one working electrode 1 does not necessarily function as all the four electrodes. For example, a half of the plurality of working electrodes 1 may function as the drive electrode of the touch sensor and the positive working electrode for tactile sense presentation. On the other hand, the remaining half of the plurality of working electrodes 1 may function as the sensing electrode of the touch sensor and the negative working electrode for tactile sense presentation. In this case, all the working electrodes 1 are allowed to function as the touch sensor and to function as the tactile sense presentation device. In this case, the number of semiconductor circuits 71 to be required for one working electrode 1 is only two. Therefore, it is possible to achieve reduction in area and cost for the semiconductor circuits 71.

Herein, determination as to whether the working electrodes 1 function as the touch sensor or the tactile sense presentation device is made on the basis of a signal to be fed to the working electrodes 1. In this embodiment, the signal to be fed to the working electrode 1 is switched by four semiconductor circuits 71 to 74 each disposed below the working electrode 1. However, the present invention is not limited to this embodiment. For example, the controller 20 may switch the signal to be fed to the working electrode 1. In this case, four semiconductor circuits 71 to 74 are not necessarily disposed for one working electrode 1. In other words, one semiconductor circuit is disposed for controlling whether or not to apply, to the working electrode 1, the drive voltage or the like to be supplied from the controller 20. Thus, it is possible to achieve reduction in area and cost for the semiconductor circuits 7.

Next, description will be given of a method of driving the semiconductor circuit 7.

Examples of the drive method include (1) a pattern write cannon drive method and (2) a working electrode sequential setting method. Hereinafter, these drive methods will be described in sequence.

1. Pattern Write Common Drive Method

The pattern write common drive method includes writing a pattern on a panel surface of a touch panel device with a tactile sense presenting function, i.e., selecting all working electrodes 1 to be used such that a drive voltage can be applied to the selected working electrodes 1, and then feeding a drive signal to the working electrodes 1.

Figure 15:
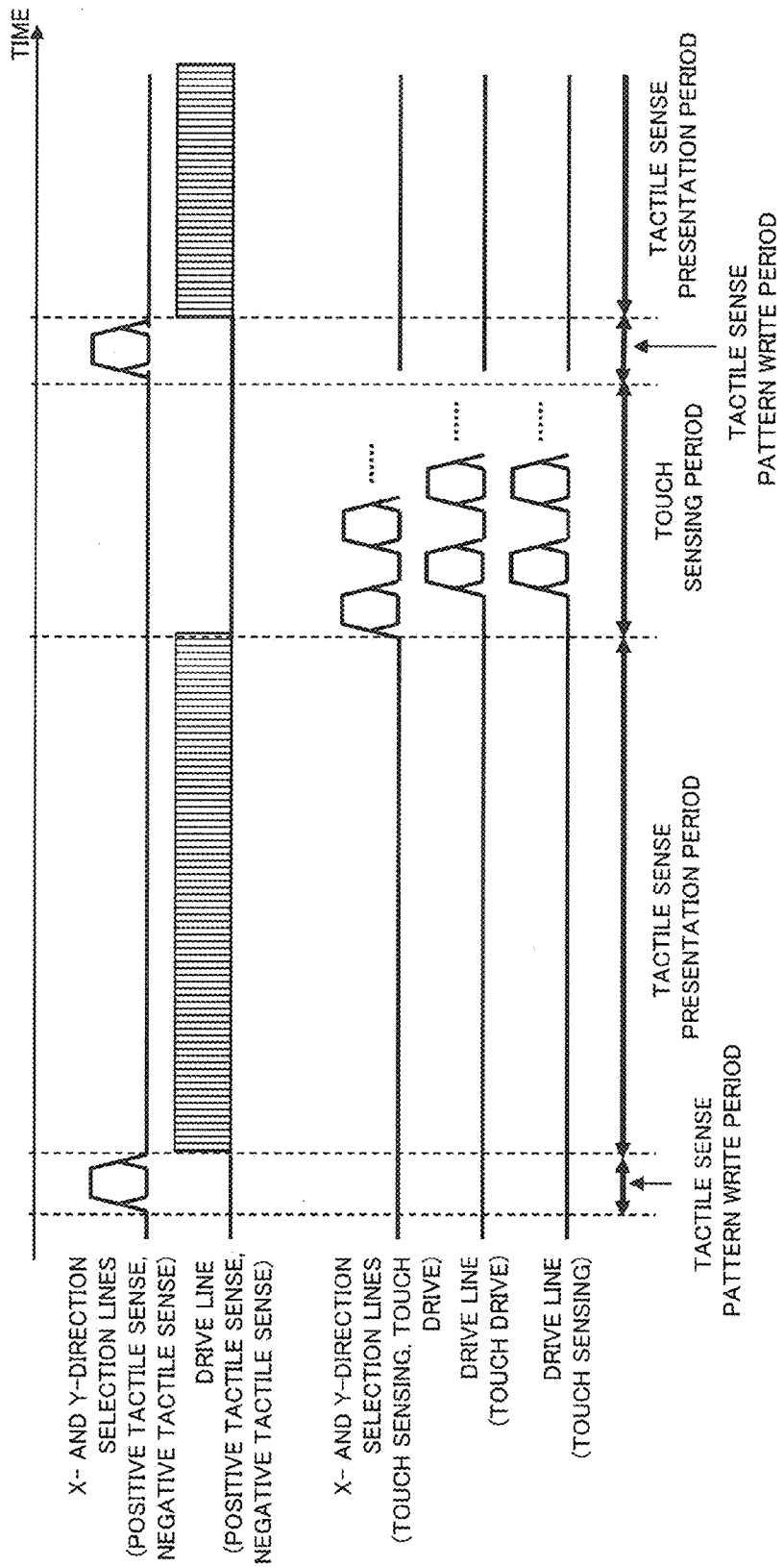
FIG. 15 is a timing chart of a pattern write common drive method.

FIG. 15 is a timing chart of the pattern write common drive method.

In the pattern write common drive method, one drive cycle is divided into three periods, i.e., a tactile sense pattern write period, a tactile sense presentation period and a touch sensing period.

In the tactile sense pattern write period, the selection signal (ON voltage) is output to the X-direction selection line (positive tactile sense) 34, the X-direction selection line (negative tactile sense) 38, the Y-direction selection line (positive tactile sense) 22 and the Y-direction selection line (negative tactile sense) 24 each corresponding to the working electrode 1 in the range where a tactile sense is presented to a user, among all the working electrodes 1.

In the tactile sense presentation period, the drive voltage is applied to the drive line (positive tactile sense) 33 and the drive line (negative tactile sense) 37 each corresponding to the working electrode 1 in the range where the tactile sense is presented to the user, among all the working electrodes 1.

In the touch sensing period, the selection signal and the drive voltage are output to the X- and Y-direction selection lines (touch sensing) 36 and 23, the X- and Y-direction selection lines (touch drive) 32 and 21, the drive line (touch sensing) 35 and the drive line (touch drive) 31 in a temporally alternate manner.

Figure 16:
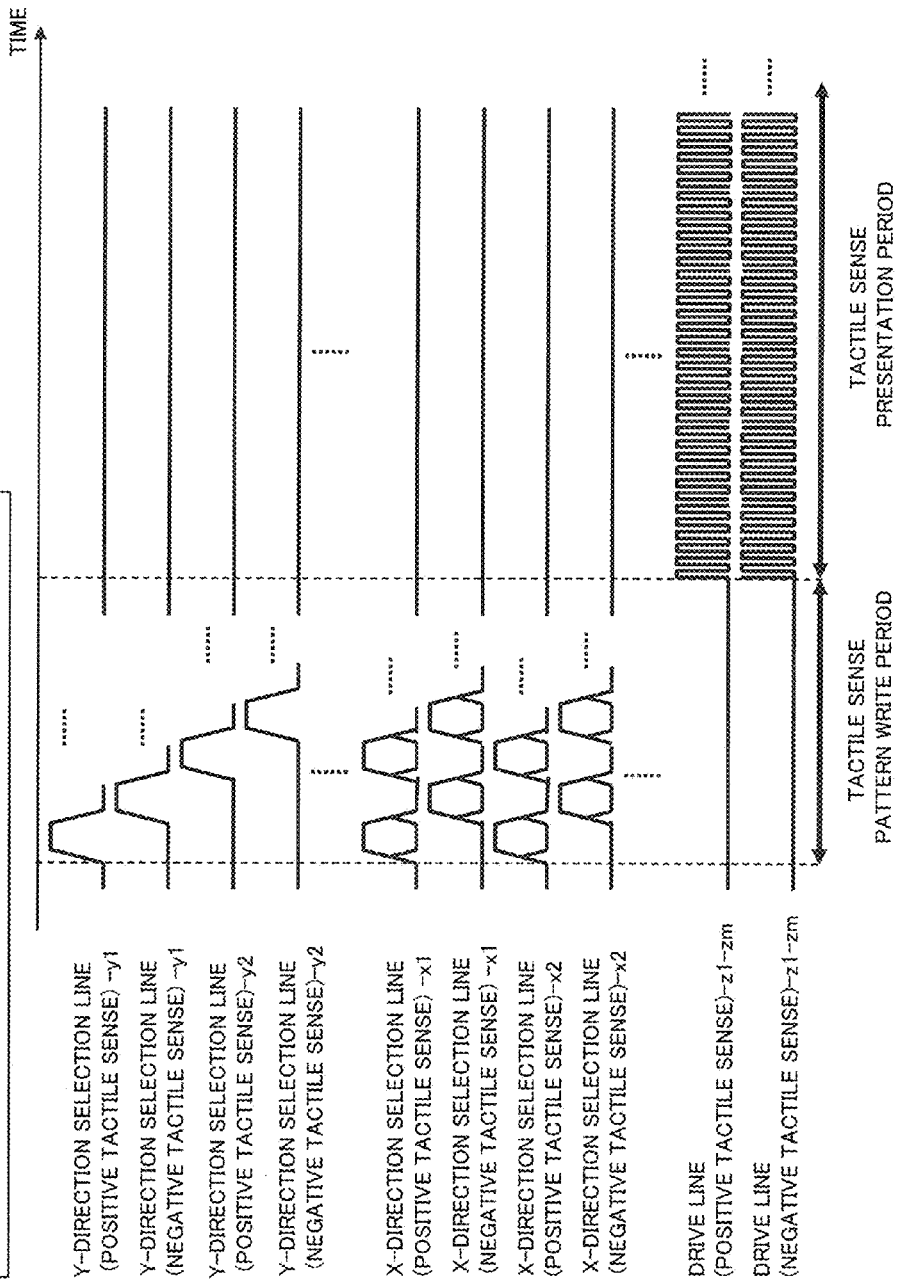
FIG. 16 is a more specific timing chart of the pattern write common drive method in a tactile sense pattern write period and a tactile sense presentation period.

FIG. 16 is a more specific timing chart of the pattern write common drive method in the tactile sense pattern write period and tactile sense presentation period.

Herein, each of the number of Y-direction selection lines (positive tactile sense) 22 and the number of Y-direction selection lines (negative tactile sense) 24 is N (N: a positive integer). The n-th (n: a positive integer) Y-direction selection line (positive tactile sense) 22 and the n-th Y-direction selection line (negative tactile sense) 24 are represented as the Y-direction selection line (positive tactile sense) yn and the Y-direction selection line (negative tactile sense) yn, respectively. Moreover, each of the number of X-direction selection lines (positive tactile sense) 34, the number of X-direction selection lines (negative tactile sense) 38, the number of drive lines (positive tactile sense) 33 and the number of drive lines (negative tactile sense) 37 is M (M: a positive integer). The m-th (m: a positive integer) X-direction selection line (positive tactile sense) 34 and the m-th X-direction selection line (negative tactile sense) 38 are represented as the X-direction selection line (positive tactile sense) xm and the X-direction selection line (negative tactile sense) xm, respectively. Additionally, the m-th drive line (positive tactile sense) 33 and the m-th drive line (negative tactile sense) 37 are represented as the drive line (positive tactile sense) zm and the drive line (negative tactile sense) zm, respectively.

In the pattern write common drive method, the working electrode 1 is set a nonoperating time e of a state as a positive working electrode for tactile sense presentation, a state as a negative working electrode for tactile sense presentation, and a state as none of the electrodes, during the tactile sense presentation period.

Upon start of the tactile sense pattern write period, the working electrode 1 which is subjected to function as a positive working electrode is set among the plurality of working electrodes 1 on the first line. Specifically, the selection signal is output to the Y-direction selection line (positive tactile sense) y1. At the same time, the selection signal is output to the X-direction selection line (positive tactile sense) corresponding to the working electrode 1 which is subjected to function as the positive working electrode, among the X-direction selection lines (positive tactile sense) 1 to m. Thus, the drive semiconductor elements 712 of the semiconductor circuits 72 corresponding to the working electrodes 1 which is subjected to function as the positive working electrode on the first line are brought into the ON state, respectively, so that the drive voltage (positive tactile sense) can be applied to each of the working electrodes 1.

Next, the working electrode 1 which is subjected to function as a negative working electrode is set among the plurality of working electrodes 1 on the first line. Specifically, the selection signal is output to the Y-direction selection line (negative tactile sense) y1. At the same time, the selection signal is also output to the X-direction selection line (negative tactile sense) corresponding to the working electrode 1 which is subjected to function as the negative working electrode, among the X-direction selection lines (negative tactile sense) 1 to m. Thus, the drive semiconductor elements 712 of the semiconductor circuits 74 corresponding to the working electrodes 1 which is subjected to function as the negative working electrode on the first line are brought into the ON state, respectively, so that the drive voltage (negative tactile sense) can be applied to each of the working electrodes 1.

Next, the working electrode 1 which is subjected to function as a positive working electrode is set among the plurality of working electrodes 1 on the second line. Specifically, the selection signal is output to the Y-direction selection line (positive tactile sense) y2. At the same time, the selection signal is also output to the X-direction selection line (positive tactile sense) corresponding to the working electrode 1 which is subjected to function as the positive working electrode, among the X-direction selection lines (positive tactile sense) 1 to m. Thus, the drive semiconductor elements 712 of the semiconductor circuits 72 corresponding to the working electrodes 1 which is subjected to function as the positive working electrode on the second line are brought into the ON state, respectively, so that the drive voltage (positive tactile sense) can be applied to each of the working electrodes 1.

Next, the working electrode 1 which is subjected to function as a negative working electrode is set among the plurality of working electrodes 1 on the second line. Specifically, the selection signal is output to the Y-direction selection line (negative tactile sense) y2. At the same time, the selection signal is also output to the X-direction selection line (negative tactile sense) corresponding to the working electrode 1 which is subjected to function as the negative working electrode, among the X-direction selection lines (negative tactile sense) 1 to m. Thus, the drive semiconductor elements 712 of the semiconductor circuits 74 corresponding to the working electrodes 1 which is subjected to function as the negative working electrode on the second line are brought into the ON state, respectively, so that the drive voltage (negative tactile sense) can be applied to each of the working electrodes 1.

With regard to each of the third to N-th lines, similarly, the working electrode 1 which is subjected to function as a positive working electrode is set among the plurality of working electrodes 1 on the n-th line. Specifically, the selection signal is output to the Y-direction selection line (positive tactile sense) yn. At the same time, the selection signal is also output to the X-direction selection line (positive tactile sense) corresponding to the working electrode 1 which is subjected to function as the positive working electrode, among the X-direction selection lines (positive tactile sense) 1 to m. Thus, the drive semiconductor elements 712 of the semiconductor circuits 72 corresponding to the working electrodes 1 which is subjected to function as the positive working electrode on the n-th line are brought into the ON state, respectively, so that the drive voltage (positive tactile sense) can be applied to each of the working electrodes 1.

With regard to each of the third to N-th lines, moreover, the working electrode 1 which is subjected to function as a negative working electrode is set among the plurality of working electrodes 1 on the n-th line. Specifically, the selection signal is output to the Y-direction selection line (negative tactile sense) yn. At the same time, the selection signal is also output to the X-direction selection line (negative tactile sense) corresponding to the working electrode 1 which is subjected to function as the negative working electrode, among the X-direction selection lines (negative tactile sense) 1 to m. Thus, the drive semiconductor elements 712 of the semiconductor circuits 74 corresponding to the working electrodes 1 which is subjected to function as the negative working electrode on the n-th line are brought into the ON state, respectively, so that the drive voltage (negative tactile sense) can be applied to each of the working electrodes 1.

Upon start of the tactile sense presentation period, the drive voltage (positive tactile sense) is applied to all the drive lines (positive tactile sense) z1 to zm, and the drive voltage (negative tactile sense) is applied to all the drive lines (negative tactile sense) z1 to zm. Thus, the drive voltage (positive tactile sense) is applied to the working electrode 1 which is subjected to function as the positive working electrode, and the drive voltage (negative tactile sense) is applied to the working electrode 1 which is subjected to function as the negative working electrode. In the example illustrated in FIG. 16, the pulse-like positive drive voltage is applied to the drive line (positive tactile sense) and the drive line (negative tactile sense) in the temporally alternate manner. However, the voltage of 0 V rather than the positive drive voltage may be applied to the drive line (negative tactile sense).

According to this drive method, since the operation of selecting the electrode is not performed during the tactile sense presentation period, the frequency and voltage of the drive signal are optionally set with ease. As the result, the drive signal can be output at a high rate. Moreover, this drive method can be realized even when the FET for generating the drive voltage has a slow switching rate.

2. Working Electrode Sequential Setting Method

The working electrode sequential setting method includes applying a constant voltage to the drive line (positive tactile sense) 33 and the drive line (negative tactile sense) 37, bringing the semiconductor circuits 7 below the working electrodes 1 into an ON state or an OFF state, and directly generating drive signals on the working electrodes 1.

Figure 17:
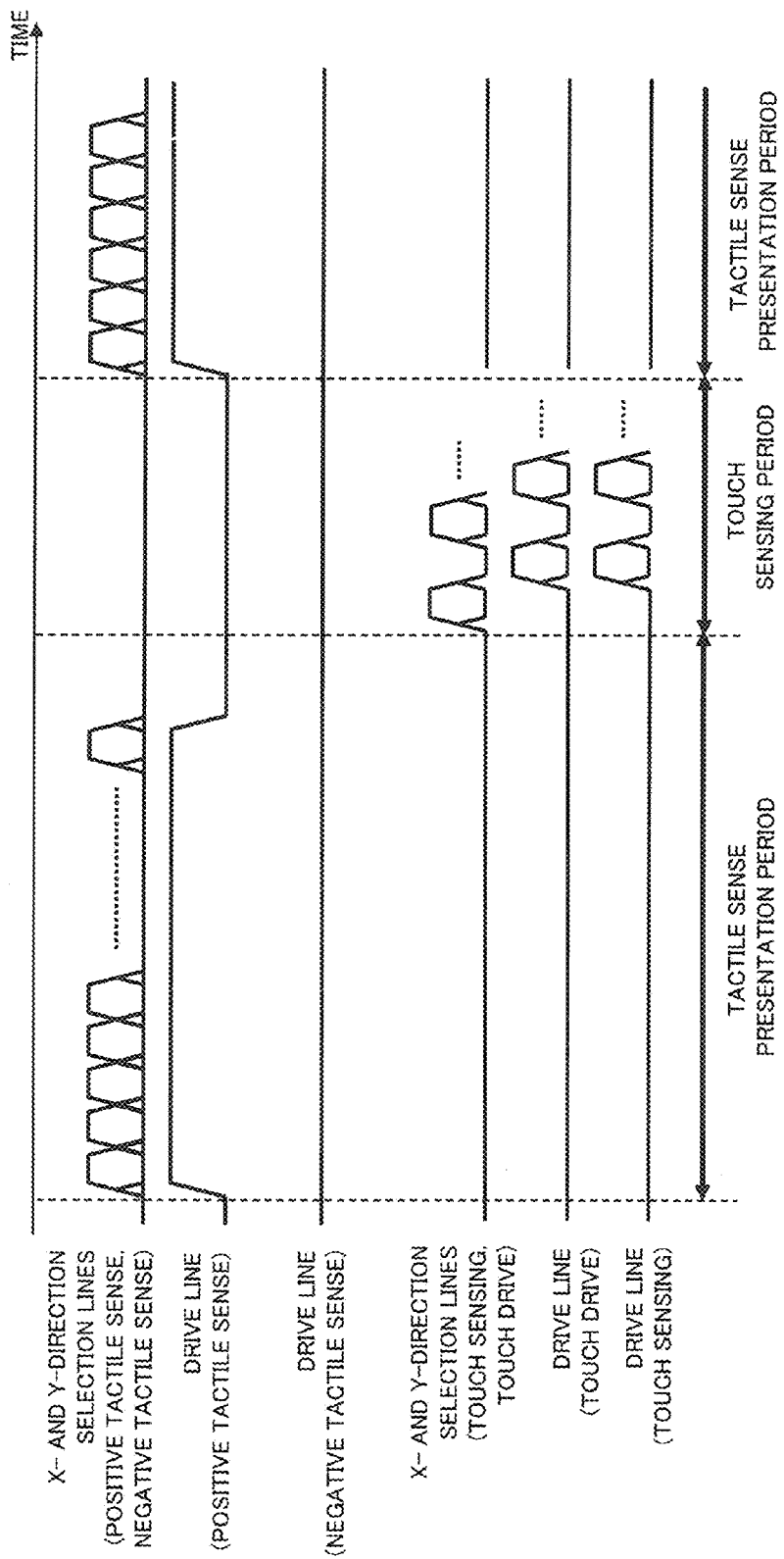
FIG. 17 is a timing chart of a working electrode sequential setting method.

FIG. 17 is a timing chart of the working electrode sequential setting method.

In the working electrode sequential setting method, one drive cycle is divided into two periods, i.e., a tactile sense presentation period and a touch sensing period.

In the tactile sense presentation period, the selection signal is output to the X-direction selection line (positive tactile sense) 34, the X-direction selection line (negative tactile sense) 38, the Y-direction selection line (positive tactile sense) 22 and the Y-direction selection line (negative tactile sense) 24. Moreover, the drive voltage (the constant voltage) is applied to the drive line (positive tactile sense) 33 and the drive line (negative tactile sense) 37. Herein, the drive voltage is not necessarily applied to the drive line (negative tactile sense) 37. FIG. 17 illustrates the case where the drive voltage is not applied to the drive line (negative tactile sense) 37.

In the touch sensing period, the selection signal and the drive voltage are output to the X- and Y-direction selection lines (touch sensing) 36 and 23, the X- and Y-direction selection lines (touch drive) 32 and 21, the drive line (touch sensing) 35, and the drive line (touch drive) 31 in a temporally alternate manner.

Figure 18:
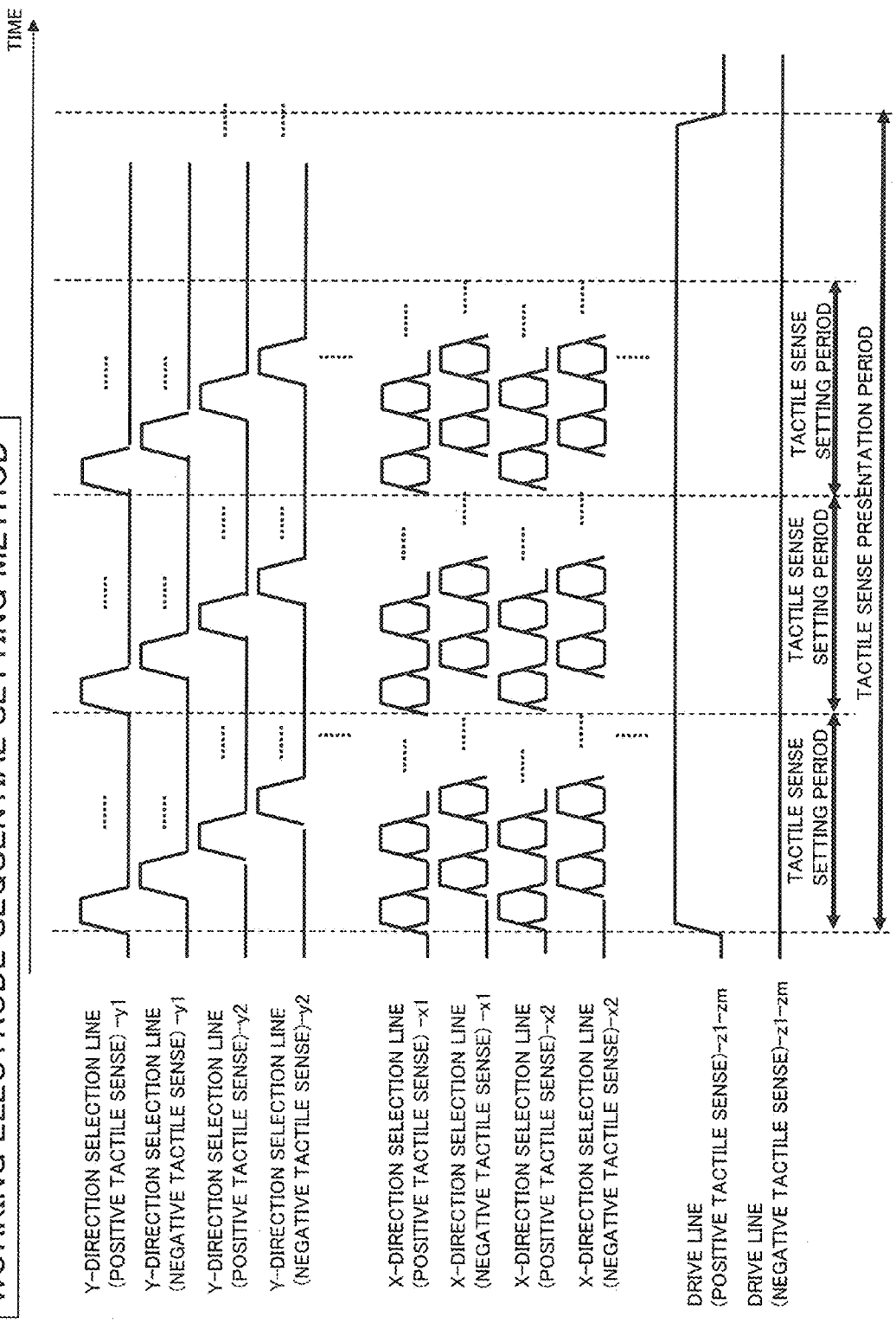
FIG. 18 is a more specific timing chart of the working electrode sequential setting method in a tactile sense presentation period.

FIG. 18 is a more specific timing chart of the working electrode sequential setting method in the tactile sense presentation period.

In the working electrode sequential setting method, upon start of the tactile sense presentation period, the drive voltage (positive tactile sense) is applied to all the drive lines (positive tactile sense) z1 to zm, and the drive voltage (negative tactile sense) is applied to all the drive lines (negative tactile sense) z1 to zm. The drive voltage (positive tactile sense) and the drive voltage (negative tactile sense) are applied sequentially during the tactile sense presentation period.

In the working electrode sequential setting method, moreover, the tactile sense presentation period is divided into a plurality of tactile sense setting periods. In each of the tactile sense setting periods, a pattern writing operation, which is similar to that in the pattern write common drive method, is performed on the Y-direction selection lines 1 to n and the X-direction selection lines 1 to m.

In each of the tactile sense setting periods, with regard to the first to N-th lines, the working electrode 1 which is subjected to function as a positive working electrode is set among the plurality of working electrodes 1 on the n-th line. Specifically, the selection signal is output to the Y-direction selection line (positive tactile sense) yn. At the same time, the selection signal is also output to the X-direction selection line (positive tactile sense) corresponding to the working electrode 1 which is subjected to function as the positive working electrode, among the X-direction selection lines (positive tactile sense) 1 to m. Thus, the drive semiconductor elements 712 of the semiconductor circuits 72 corresponding to the working electrodes 1 which is subjected to function as the positive working electrode on the n-th line are brought into the ON state, respectively, so that the drive voltage (positive tactile sense) can be applied to each of the working electrodes 1.

With regard to the first to N-th lines, moreover, the working electrode 1 which is subjected to function as a negative working electrode is set among the plurality of working electrodes 1 on the n-th line. Specifically, the selection signal is output to the Y-direction selection line (negative tactile sense) yn. At the same time, the selection signal is also output to the X-direction selection line (negative tactile sense) corresponding to the working electrode 1 which is subjected to function as the negative working electrode, among the X-direction selection lines (negative tactile sense) 1 to m. Thus, the drive semiconductor elements 712 of the semiconductor circuits 74 corresponding to the working electrodes 1 which is subjected to function as the negative working electrode on the n-th line are brought into the ON state, respectively, so that the drive voltage (negative tactile sense) can be applied to each of the working electrodes 1.

In the working electrode sequential setting method, upon start of the tactile sense presentation period, the drive voltage (positive tactile sense) and the drive voltage (negative tactile sense) are sequentially applied during the tactile sense presentation period. Therefore, when the drive semiconductor element 712 of the semiconductor circuit 72 or 74 corresponding to the working electrode 1 which is subjected to function as a working electrode for positive tactile sense (negative tactile sense) is brought into the ON state, at the same time, the drive voltage (positive tactile sense) or the drive voltage (negative tactile sense) is applied to the working electrode 1.

After the current tactile sense setting period, the next tactile sense setting period is started. In the working electrode sequential setting method, as described above, the signals are output to the Y-direction selection line (positive tactile sense) and the Y-direction selection line (negative tactile sense), to each X-direction selection line (negative tactile sense), and to each X-direction selection line (negative tactile sense) for each tactile sense setting period. Therefore, it is possible to set a single working electrode 1 at any one of a state as a positive working electrode for tactile sense presentation, a state as a negative working electrode for tactile sense presentation, and a state as none of the working electrodes described above, for each tactile sense setting period. That is, it is possible to temporally switch the state of the working electrode 1.

According to this drive method, it is possible to present a different tactile sense for each working electrode.

In the example illustrated in FIG. 18, the drive voltage is applied to only the drive line (positive tactile sense); however, the present invention is not limited to this example. For example, the drive voltage may be applied to both the drive line (positive tactile sense) and the drive line (negative tactile sense). Alternatively, the drive voltage may be applied to only the drive line (negative tactile sense).

3. Voltage Waveform

Figure 19:
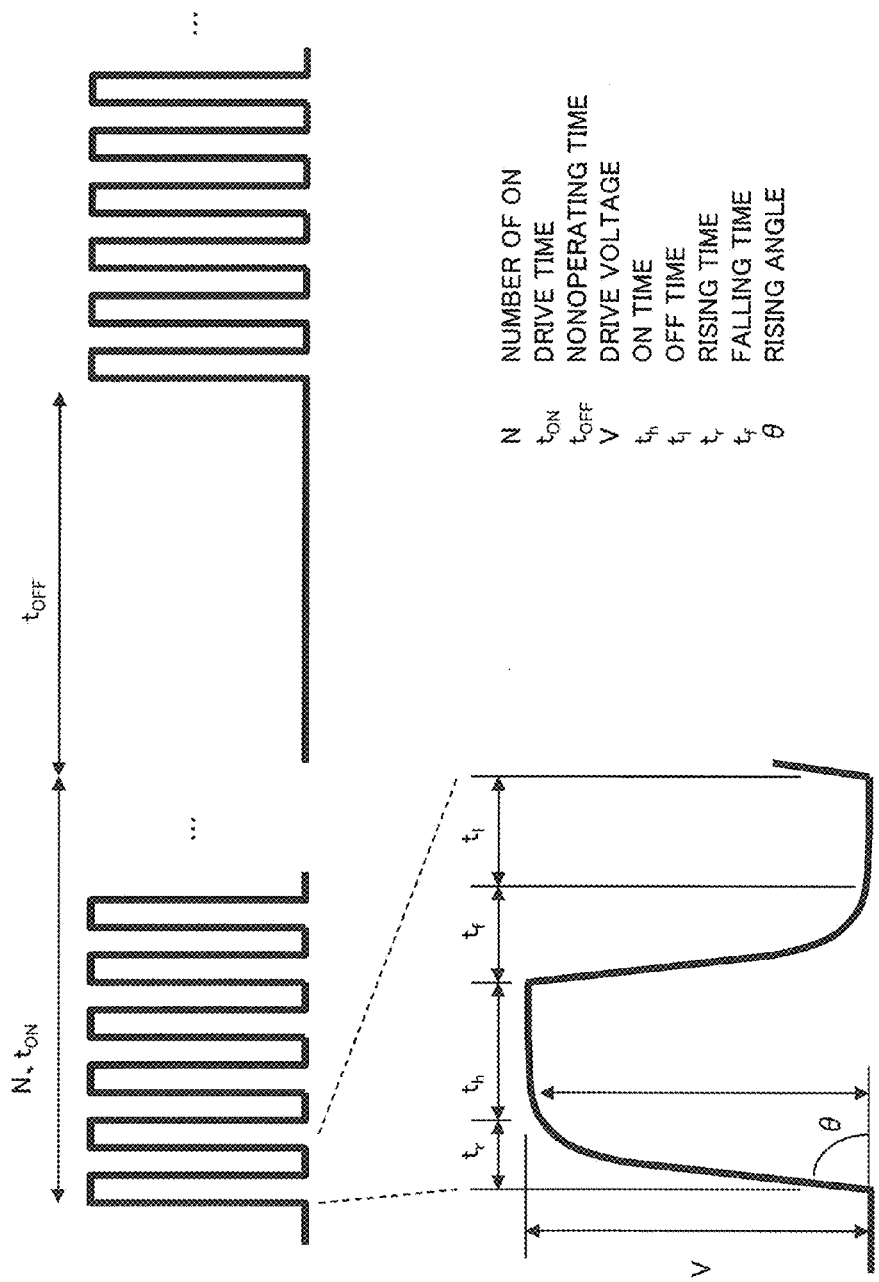
FIG. 19 is a diagram illustrating one example of a waveform of a drive voltage.

FIG. 19 is a diagram illustrating one example of the waveform of the drive voltage in the pattern write corm on drive method.

In FIG. 19, N indicates the number of ON states in the tactile sense presentation period, tON indicates a drive time (the tactile sense presentation period), tOFF indicates a non-operating time (the tactile sense pattern write period), V indicates a drive voltage, th indicates an ON time, tl indicates an OFF time, tr indicates a rising time, tf indicates a falling time, and θ indicates a rising angle.

It is possible to present various tactile senses to a user's finger by adjusting the parameters of the voltage waveform.

The third embodiment describes the specific example of the configuration including the semiconductor circuits 7, the first conductors 2 and the second conductors 3; however, the semiconductor circuits 7, the first conductors 2 and the second conductors 3 are not limited to the configuration. For example, the semiconductor circuit 7 may not be provided for each working electrode 1, but for the predetermined number of working electrodes 1 such that one semiconductor circuit 7 controls the plurality of working electrodes 1 concurrently.

(Fourth Embodiment)

The fourth embodiment describes an example of a specific configuration of a controller 20.

Figure 20:
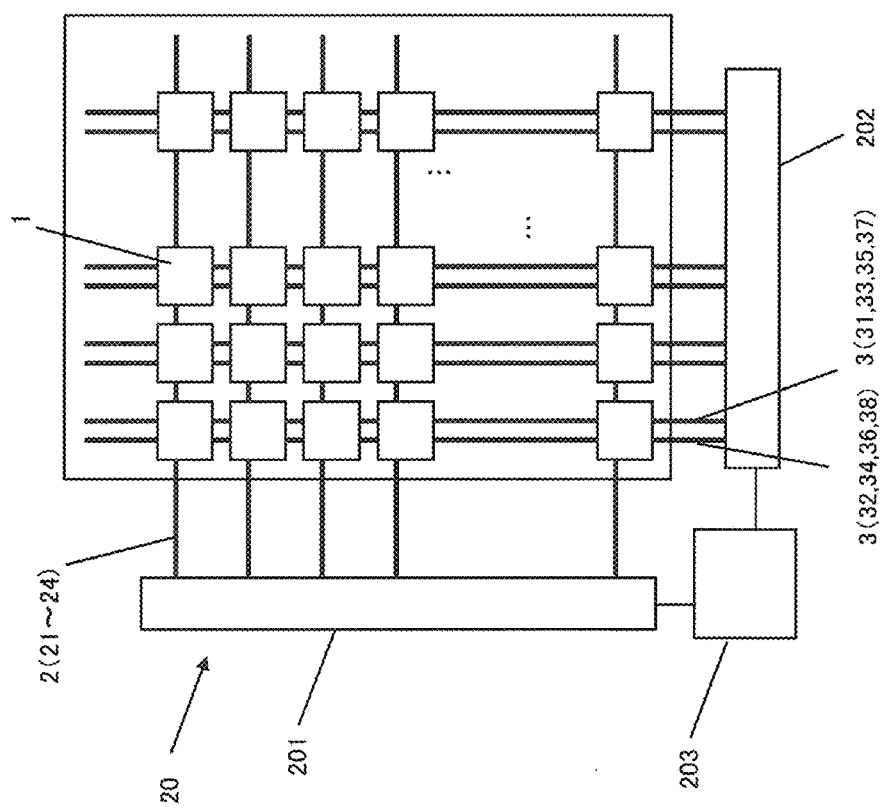
FIG. 20 is a diagram illustrating one example of a specific configuration of a controller 20 according to a fourth embodiment regarding yet another aspect of the present invention.

FIG. 20 is a diagram illustrating the specific configuration of the controller 20 according to this embodiment.

The controller 20 includes a Y-direction selection control semiconductor element 201, an X-direction selection control semiconductor element 202, and a controller 203 for controlling these elements 201 and 202.

The Y-direction selection control semiconductor element 201 selectively outputs a Y-direction selection signal to a plurality of Y-direction selection lines 2 (21 to 24).

The X-direction selection control semiconductor element 202 selectively outputs an X-direction selection signal to a plurality of X-direction selection lines 3 (32, 34, 36, 38). Moreover, the X-direction selection control semiconductor element 202 selectively applies a drive voltage to the plurality of drive lines 3 (31, 33, 35, 37).

The X-direction selection control semiconductor element 202 may be divided into plural elements in accordance with the number of X-direction selection lines 3 (32, 34, 36, 38). For example, in the case where the number of X-direction selection lines 3 (32, 34, 36, 38) is 10 to 400, one semiconductor element may be used. On the other hand, in the case where the number exceeds 400, plural semiconductor elements may be used. The similar things may hold true for the Y-direction semiconductor element as in the X-direction semiconductor element.

According to this embodiment, the X-direction selecting semiconductor element and the drive voltage applying drive semiconductor element are integrated into one. Therefore, it is possible to achieve chip cost reduction, implementation cost reduction, and size reduction.

(Fifth Embodiment)

The fifth embodiment describes a different example of a specific configuration of a controller 20.

Figure 21:
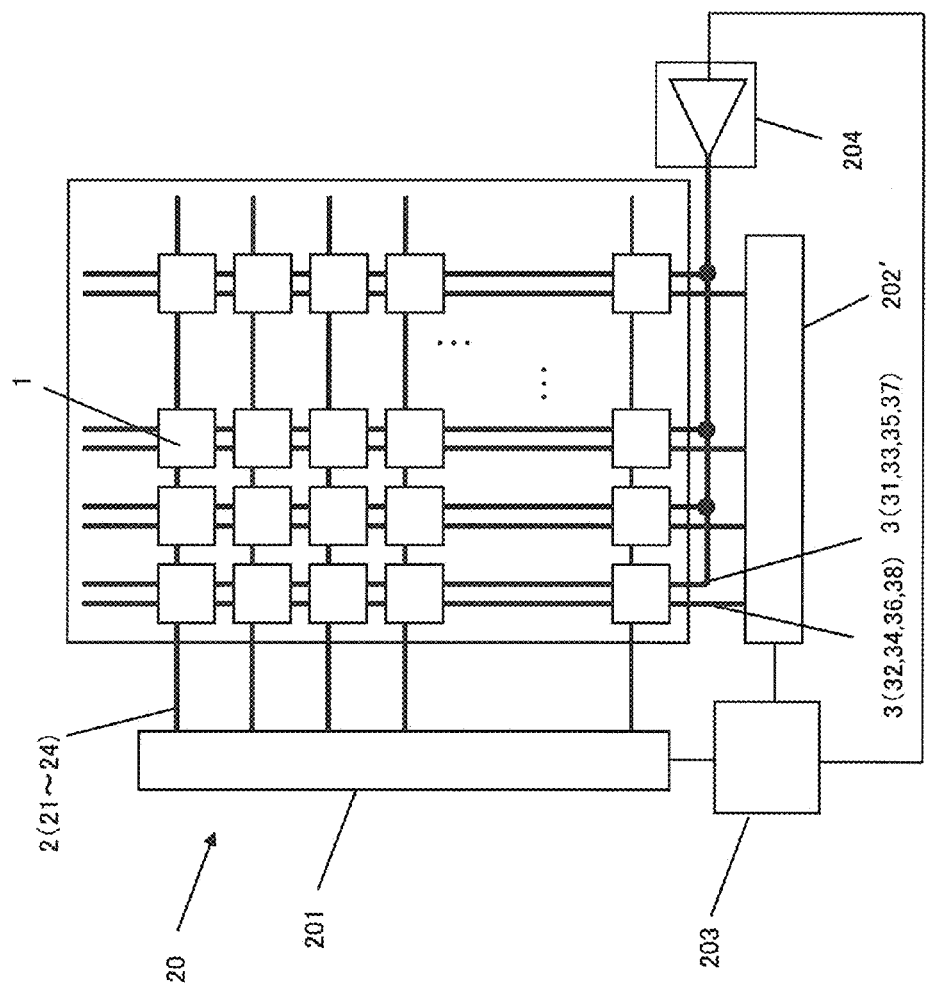
FIG. 21 is a diagram illustrating another example of a specific configuration of a controller 20 according to a fifth embodiment regarding yet another aspect of the present invention.

FIG. 21 is a diagram illustrating the specific configuration of the controller 20 according to this embodiment.

The controller 20 includes a Y-direction selection control semiconductor element 201, an X-direction selection control semiconductor element 202', a driving driver element 204, and a controller 203 for controlling these elements.

The Y-direction selection control semiconductor element 201 selectively outputs a Y-direction selection signal to a plurality of Y-direction selection lines 2 (21 to 24).

The X-direction selection control semiconductor element 202' selectively outputs an X-direction selection signal to a plurality of X-direction selection lines 3 (32, 34, 36, 38)).

The driving driver element 204 applies a drive voltage to a plurality of drive lines.

Herein, the X-direction selection control semiconductor element 202' may be divided into plural elements in accordance with the number of X-direction selection lines. For example, in the case where the number of X-direction selection lines is 10 to 400, one semiconductor element may be used. In the case where the number exceeds 400, plural semiconductor elements may be used. The similar things may hold true for the Y-direction semiconductor element as in the X-direction semiconductor element.

Typically, a drive voltage is required to be high. Therefore, the X-direction selecting semiconductor element is required to be resistant to high voltage in order to generate such a drive voltage. According to this embodiment, however, the driving driver element 204 for applying a high voltage is separated from the X-direction selecting semiconductor element. Therefore, it is possible to use the X-direction selecting semiconductor element which is resistant to low voltage. Thus, it is possible to reduce costs for a touch panel device with a tactile sense presenting function.

SUMMARY OF THE ASPECTS OF THE INVENTION (1) According to a first aspect of the present invention, a touch panel device with a tactile sense presenting function includes: a plurality of electrodes arranged on a single plane; and a controller that performs a first operation and a second operation in a time division manner, wherein the first operation includes applying a first voltage to some of the electrodes, detecting voltages generated on at least some of the remaining electrodes in this state, and detecting a position of a dielectric which is in proximity to the touch panel device, on the basis of the detected voltages, and the second operation includes applying a second voltage to some of the electrodes, and generating a varying electric field with the some electrodes.

Thus, it is possible to provide the touch panel device with the tactile sense presenting function, the touch panel device being capable of efficiently presenting a tactile sense to a user.

(2) According to a second aspect of the present invention, the touch panel device with the tactile sense presenting function according to the first aspect may further include: a plurality of first conductors extending in a predetermined direction at predetermined intervals; and a plurality of second conductors extending in a direction which is different from the extending direction of the first conductors, at predetermined intervals. Herein, the plurality of electrodes may include a plurality of first electrodes disposed on the corresponding first conductors at predetermined intervals and connected to the first conductors, respectively, and a plurality of second electrodes disposed on the corresponding second conductors at predetermined intervals and connected to the second conductors, respectively. Moreover, the controller may perform the first operation and the second operation in a time division manner, wherein the first operation includes applying the first voltage to some of the first electrodes through the first conductors corresponding to the some first electrodes, detecting voltages generated on at least some of the second electrodes in this state, through the second conductors corresponding to the some second electrodes, and detecting a position of a dielectric which is in proximity to the touch panel device, on the basis of the detected voltages, and the second operation includes applying the second voltage to some of the second electrodes through the first conductors corresponding to the some second electrodes, and generating a varying electric field with the some second electrodes.

Thus, it is possible to select the electrode for providing the touch sensor function and the tactile sense presenting function, from the plurality of electrodes in a unit of the first conductor or in a unit of the second conductor.

(3) According to a third aspect of the present invention, the touch panel device with the tactile sense presenting function according to the first aspect may further include: a plurality of first conductors extending in a predetermined direction at predetermined intervals; a plurality of second conductors extending in a direction which is different from the extending direction of the first conductors, at predetermined intervals; and a plurality of semiconductor circuits disposed on intersections between the first conductors and the second conductors, respectively. Herein, the electrodes may be disposed on the intersections between the first conductors and the second conductors and may be connected to the semiconductor circuits on the intersections, respectively. Moreover, the controller may perform the first operation and the second operation in a time division manner, wherein the first operation includes outputting a control signal to some of the semiconductor circuits corresponding to some of the electrodes through the first and second conductors corresponding to the some semiconductor circuits to bring the some semiconductor circuits selectively into an ON state and then applying the first voltage to the some electrodes through the some semiconductor circuits, and outputting a control signal to the some semiconductor circuits corresponding to the remaining electrodes through the remaining first and second conductors in this state to bring the some semiconductor circuits selectively into the ON state and then detecting voltages generated on the electrodes, through the some semiconductor circuits, and the second operation includes outputting a control signal to some of the semiconductor circuits corresponding to some of the electrodes through the first and second conductors corresponding to the some semiconductor circuits to bring the some semiconductor circuits selectively into the ON state, applying the second voltage to the some electrodes through the some semiconductor circuits, and generating a varying electric field with the some electrodes.

Thus, it is possible to optionally select the electrode for providing the touch sensor function and the tactile sense presenting function, from the plurality of electrodes in a unit of the electrode.

(4) According to a fourth aspect of the present invention, the touch panel device with the tactile sense presenting function according to any one of the first to third aspects may further include an insulator disposed on a surface of each electrode.

Thus, it is possible to prevent an object such as a finger from coming into contact with the surface of each electrode. Therefore, it is possible to realize, with reliability, the touch sensor function based on the capacitance between the electrodes and the tactile sense presenting function based on the electric field between the electrode and the dielectric.

(5) According to a fifth aspect of the present invention, in the touch panel device with the tactile sense presenting function according to any one of the first to fourth aspects, the first conductor and the second conductor may be orthogonal to each other.

Thus, it is possible to dispose the electrodes with ease.

Herein, the function of "detecting the position of the dielectric which is in proximity to the touch panel device, on the basis of the detected voltages" in the controller is realized with, for example, a hardware resource (a collaboration of a processor and a program on a memory). Specifically, the function can be realized with a collaboration of a processor in the controller 20 and a program on a memory. Herein, the controller may be realized with a hard-wired element.

INDUSTRIAL APPLICABILITY

The touch panel device with the tactile sense presenting function according to one aspect of the present invention is applicable to mobile information terminals such as a smartphone and a smartpad. The touch panel device is also applicable to, for example, a console panel of an automobile, a console panel of a home electric appliance, and a guide board for the blind.

DESCRIPTION OF REFERENCE CHARACTERS

1 Working electrode
2 First conductor
3 Second conductor
4 Insulator
5 Dielectric
6 Voltage source
7 Semiconductor circuit
20 Controller
11 Sensing electrode
12 Drive line
13 Positive working electrode
14 Negative working electrode
21 Y-direction selection line (touch drive)
22 Y-direction selection line (positive tactile sense)
23 Y-direction selection line (touch sensing)
24 Y-direction selection line (negative tactile sense)
31 Drive line (touch drive)
32 X-direction selection line (touch drive)
33 Drive line (positive tactile sense)
34 X-direction selection line (positive tactile sense)
35 Drive line (touch sensing)
36 X-direction selection line (touch sensing)
37 Drive line (negative tactile sense)
38 X-direction selection line (negative tactile sense)
71 Semiconductor circuit (touch drive)
72 Semiconductor circuit (positive tactile sense)
73 Semiconductor circuit (touch sensing)
74 Semiconductor circuit (negative tactile sense)
711 X-direction selection semiconductor element
712 Drive semiconductor element
201 Y-direction selection control semiconductor element
202, 202' X-direction selection control semiconductor element
203 Controller
204 Driving driver element

The invention claimed is:

1. A touch panel device with a tactile sense presenting function,
the touch panel device comprising:
a plurality of electrodes arranged on a single plane;
a controller that performs a first operation and a second operation in a time division manner, wherein the first operation includes applying a first voltage which changes temporally, to some of the electrodes, detecting voltages generated on at least some of the remaining electrodes, and detecting a position of a dielectric which is in proximity to the touch panel device, on the basis of the detected voltages, and wherein the second operation includes applying a second voltage which changes temporally, to some of the electrodes, and generating a varying electric field with the electrodes to which the second voltage is applied;
a plurality of first conductors extending in a first predetermined direction at predetermined intervals;
a plurality of second conductors extending in a second predetermined direction, which is different from the first predetermined direction of the first conductors, at predetermined intervals; and
a plurality of semiconductor circuits disposed right above intersections of the first conductors and the second conductors, respectively,
wherein:
the electrodes are disposed right above the intersections of the first conductors and the second conductors and are connected to the semiconductor circuits that are above the intersections, respectively; and
the first operation includes outputting a control signal to some of the semiconductor circuits through the first and second conductors corresponding to the some semiconductor circuits to bring the some semiconductor circuits selectively into an ON state and then applying the first voltage to the electrodes, that correspond to the some semiconductor circuits, through the some semiconductor circuits, and outputting the control signal to the semiconductor circuits corresponding to the remaining electrodes through the remaining first and second conductors to bring the semiconductor circuits corresponding to the remaining electrodes selectively into the ON state and then detecting voltages generated on the electrodes, through the semiconductor circuits corresponding to the remaining electrodes, and wherein the second operation includes outputting the control signal to some of the semiconductor circuits through the first and second conductors corresponding to the some semiconductor circuits to bring the semiconductor circuits selectively into the ON state, applying the second voltage to the electrodes that correspond to the some semiconductor circuits, through the some semiconductor circuits, and generating the varying electric field with the electrodes to which the second voltage is applied.

2. The touch panel device with the tactile sense presenting function according to claim 1, further comprising:
an insulator disposed on a surface of each electrode.

3. The touch panel device with the tactile sense presenting function according to claim 1, wherein
the first predetermined direction, in which the first conductors extend, is orthogonal to the second predetermined direction, in which the second conductors extend.

4. The touch panel device with the tactile sense presenting function according to claim 2, wherein
the first predetermined direction, in which the first conductors extend, is orthogonal to the second predetermined direction, in which the second conductors extend.

5. The touch panel device with the tactile sense presenting function according to claim 1, further comprising an insulator disposed on a surface of each electrode, wherein
the plurality of electrodes, the insulator, the plurality of first conductors and the plurality of second conductors are transparent in a wavelength region of a visible light beam.

6. The touch panel device with the tactile sense presenting function according to claim 2, wherein
the plurality of electrodes, the insulator, the plurality of first conductors and the plurality of second conductors are transparent in a wavelength region of a visible light beam.

7. The touch panel device with the tactile sense presenting function according to claim 3, further comprising an insulator disposed on a surface of each electrode, wherein
the plurality of electrodes, the insulator, the plurality of first conductors and the plurality of second conductors are transparent in a wavelength region of a visible light beam.

8. The touch panel device with the tactile sense presenting function according to claim 4, wherein
the plurality of electrodes, the insulator, the plurality of first conductors and the plurality of second conductors are transparent in a wavelength region of a visible light beam.

* * * * *